US008386086B2

(12) United States Patent
Roux et al.

(10) Patent No.: US 8,386,086 B2
(45) Date of Patent: Feb. 26, 2013

(54) METHODS AND SYSTEMS FOR ANALYZING ENERGY USAGE

(75) Inventors: Gaëlle Le Roux, Grasse (FR); Younes Souilmi, Antibes (FR); Scott W. Kurth, Arlington Heights, IL (US); John M. Akred, Chicago, IL (US); Thorvald Hoyem, Antibes (FR); Sanjay Mathur, Sunnyvale, CA (US)

(73) Assignee: Accenture Global Services Limited, Dublin (IE)

( * ) Notice: Subject to any disclaimer, the term of this patent is extended or adjusted under 35 U.S.C. 154(b) by 246 days.

(21) Appl. No.: 12/767,259

(22) Filed: Apr. 26, 2010

(65) Prior Publication Data

US 2011/0264291 A1    Oct. 27, 2011

(51) Int. Cl.
*G06F 1/28* (2006.01)
(52) U.S. Cl. .................. 700/291; 700/295; 700/296
(58) Field of Classification Search .................. 700/286, 700/291, 295, 296; 702/57, 60, 61; 705/412
See application file for complete search history.

(56) References Cited

U.S. PATENT DOCUMENTS

| | | | | |
|---|---|---|---|---|
| 5,566,084 A * | 10/1996 | Cmar | | 700/276 |
| 6,757,591 B2 * | 6/2004 | Kramer | | 700/288 |
| 6,785,592 B1 * | 8/2004 | Smith et al. | | 700/291 |
| 7,444,189 B1 * | 10/2008 | Marhoefer | | 700/26 |
| 7,478,070 B2 * | 1/2009 | Fukui et al. | | 705/412 |
| 7,542,824 B2 * | 6/2009 | Miki et al. | | 700/291 |
| 8,019,445 B2 * | 9/2011 | Marhoefer | | 700/26 |
| 8,019,697 B2 * | 9/2011 | Ozog | | 705/412 |
| 2001/0025209 A1 * | 9/2001 | Fukui et al. | | 700/291 |
| 2002/0082747 A1 * | 6/2002 | Kramer | | 700/276 |
| 2003/0163224 A1 * | 8/2003 | Klaar et al. | | 700/291 |
| 2007/0005191 A1 * | 1/2007 | Sloup et al. | | 700/276 |
| 2009/0048716 A1 * | 2/2009 | Marhoefer | | 700/291 |
| 2011/0166959 A1 * | 7/2011 | Winter et al. | | 705/26.25 |

OTHER PUBLICATIONS

POBICOS Consortium, POBICOS: Platform for Opportunistic Behaviour in Incompletely Specified, Heterogeneous Object Communities, May 29, 2009 (27 pages).
Ingrid Rohmund et al., Assessment of Achievable Potential for Energy Efficiency and Demand Response in the U.S., Aug. 2008 (12 pages).
Jacopo Torriti et al., Demand Response Experience in Europe: Policies, Programmes, and Implementation, May 21, 2009 (9 pages).
Ahmad Faruqui et al., Household Response to Dynamic Pricing of Electricity—A Survey of the Experimental Evidence, Jan. 10, 2009 (53 pages).
Charles River Associates, Impact Evaluation of the California Statewide Pricing Pilot, Mar. 16, 2005 (131 pages).

(Continued)

*Primary Examiner* — Charles Kasenge
(74) *Attorney, Agent, or Firm* — Finnegan, Henderson, Farabow, Garrett & Dunner, LLP

(57) ABSTRACT

Systems and methods consistent with the present invention allow an energy consumption index to be generated from DR response data and influencer data. The energy consumption index may indicate the energy consumption of a consumer before receiving a DR signal, the change in the consumption after the consumer receives a DR signal, and the consumer's propensity to respond to a DR signal. Systems and methods consistent with the present invention also allow energy providers to monitor, forecast, and plan for changes in consumer demand for energy. Various energy planning tools may facilitate an energy provider's ability to monitor, forecast, and plan for such changes.

33 Claims, 20 Drawing Sheets

OTHER PUBLICATIONS

Ahmad Faruqui et al., Lessons from Demand Response: Trials and Potential Savings for the EU, Oct. 12, 2009 (41 pages).
Federal Energy Regulatory Commission, A National Assessment of Demand Response Potential, Jun. 2009 (254 pages).
The Brattle Group et al., National Demand Response Potential Model Guide, Jun. 2009 (31 pages).
Ontario Energy Board, Ontario Energy Board Smart Price Pilot Final Report, Jul. 2007 (221 pages).
Ahmad Faruqui et al., Quantifying Customer Response to Dynamic Pricing, May 2005 (11 pages).
Zarko Sumic, Utility Consumer Survey: Energy Efficiency, Do They Care and Why?, May 6, 2009 (16 pages).
Australian Government, IP Australia, Patent Application No. 2011201196, Patent Examination Report No. 1, dated Sep. 11, 2012 (3 pages).

* cited by examiner

| LEVEL | Time of Year | Time of Day | Location | Weather | Customer | DR Signal | Appliance |
|---|---|---|---|---|---|---|---|
| 0 | Full Year | All Day | Continent | All Seasons | All Residential | All | All |
| 1 | Quarter | Day/Night | Country | Season | Housing Type | Type | Major/Small |
| 2 | Month | Period of Day | Region | Temperature Range | Family Type | Program | |
| 3 | Week | Hour | City | | | | |
| 4 | Day | 15 minutes | | | | | |

FIG. 13

METHODS AND SYSTEMS FOR ANALYZING ENERGY USAGE

The work leading to this invention has received funding from the European Community's Seventh Framework Programme (FP7/2007-2013) under Grant Agreement No. 223984.

TECHNICAL FIELD

Methods and systems are described which relate to analyzing energy users' consumption of energy, and the uses of such analyses.

BACKGROUND

The first electrical energy distribution systems, designed over a century ago, bore the hallmarks of centralized generation and unilateral flow of power. Among the problems associated with early power distribution systems were the hazards of direct current electricity, the isolated nature of each distribution network, the difficulty in predicting demand, the potential for cascading failures caused by discrete breakdowns, and the inefficient transmission of power over long distances.

Some of these problems have been successfully addressed in later years. For example, the switch to alternating current electricity made long-distance power transmission more safe and efficient, and new power grid topologies made distribution less vulnerable to catastrophic failure. Yet, some of these same problems currently remain in the industry.

In particular, measuring, predicting, and planning for changes in consumer demand for energy has proven difficult since the beginning, and remains so today. Despite this difficulty, accurate determinations of demand are important for utility companies, because imbalances between production and consumption can cause brownouts, and even blackouts. Given the short timeframe between production and consumption, these imbalances can become disastrous almost as soon as they are detected, if not before detection. Utility companies are also forced to maintain the generation and distribution capacity to satisfy peak loads, even if such loads occur very infrequently. A delicate balance, therefore, must be struck between overproduction and underproduction lest grid failures occur.

SUMMARY

Disclosed herein are computer-implemented methods of analyzing energy usage. An exemplary method includes receiving demand response ("DR") response data from a first group of energy users. The DR response data is associated with influencer data, stored in a database, regarding the first group of energy users. An energy consumption index is determined for the first group of energy users, wherein the energy consumption index includes: a value of energy consumption before DR data is communicated to devices corresponding to the first group of energy users, a propensity of the first group of energy users to alter energy consumption in response to DR data, and a change in energy consumption, after DR data is communicated to devices corresponding to the first group of energy users. An energy consumption index is established for a second group of energy users based on the energy consumption index for the first group of energy users.

Also disclosed are systems for managing energy usage by leveraging demand response ("DR") data. An exemplary system includes a first database storing DR response data received from usage devices corresponding a first group of energy users and a second database storing influencer data regarding the first group of energy users. The exemplary system also includes a computer processor coupled to the first database and the second database. The computer processor associates the DR response data with the influencer data and further determines an energy consumption index for the first group of energy users and establishes an energy consumption index for a second group of energy users based on the energy consumption index for the first group of energy users. The energy consumption index for the first group of energy consumers includes: a value of energy consumption before DR data is communicated to usage devices corresponding to the first group of energy users, a propensity of the first group of energy users to alter energy consumption in response to DR data, and a change in energy consumption, after DR data is communicated to usage devices corresponding to the first group of energy users.

Further disclosed are computer-implemented methods of managing energy provision. The methods include determining energy planning criteria for a group of energy users, wherein the energy planning criteria include: a forecast, created using a computer, of a propensity of the group of energy users to alter energy consumption, a forecast, created using a computer, of an energy consumption of the group of energy users, and a determination of an actual energy consumption of the group of energy users. An optimal level of a factor regarding energy provision is determined based on the energy planning criteria. A signal to send to receiving devices of a target group of energy users is determined to achieve the optimal level of the factor regarding energy provision.

Various other embodiments are disclosed as well. It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the invention and together with the description, serve to explain the principles of the invention.

BRIEF DESCRIPTION OF THE DRAWINGS

FIG. 13 depicts one exemplary hierarchical structure of dimension data.

DETAILED DESCRIPTION

Figure 1A:
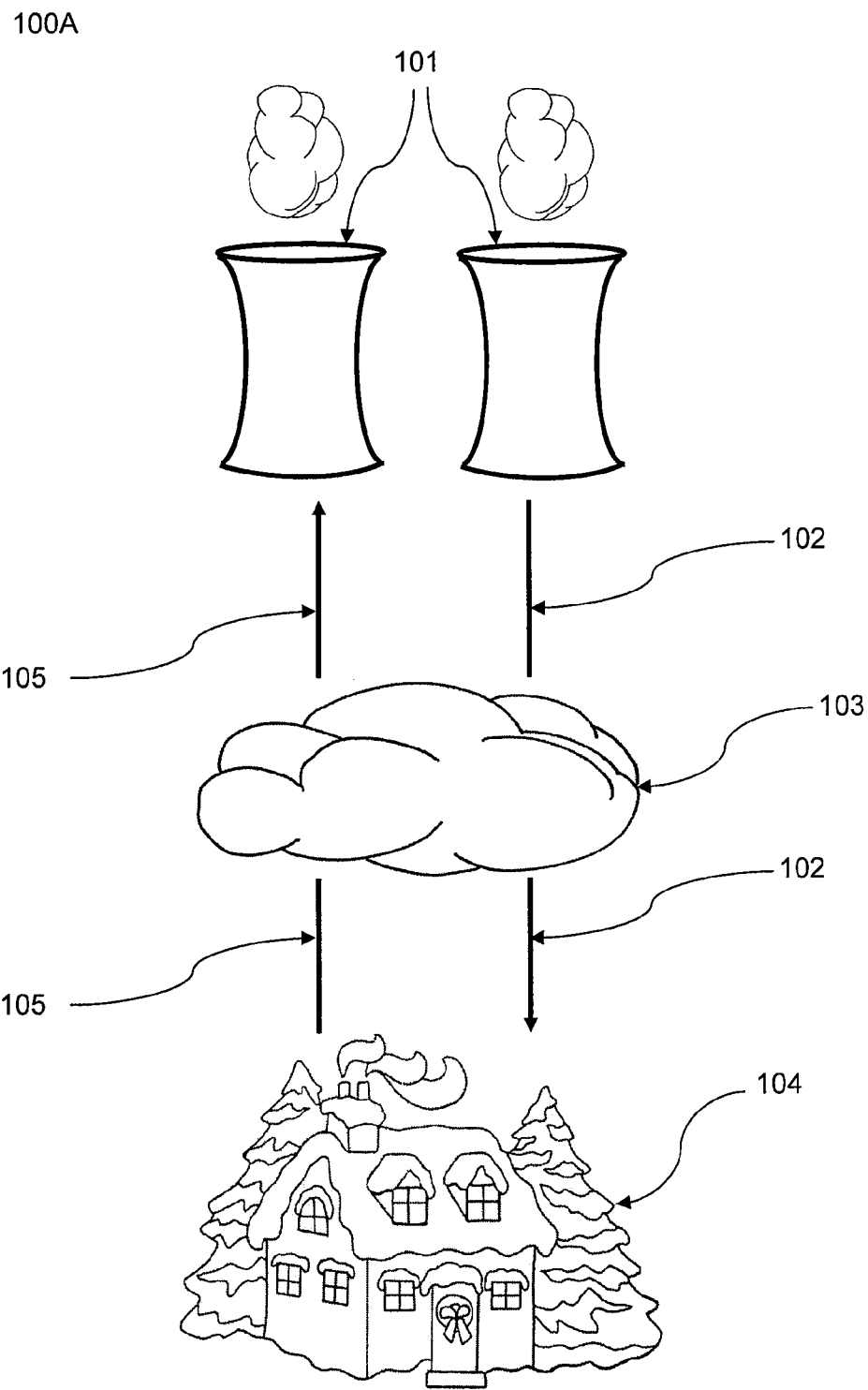
FIG. 1A depicts an exemplary arrangement for sending and receiving demand response ("DR") signals and DR response signals.

Reference will now be made in detail to the exemplary embodiments, examples of which are illustrated in the accompanying drawings. Wherever convenient, the same reference numbers will be used throughout the drawings to refer to the same or like parts.

Smart grid energy technology may include the ability of energy providers and consumers to communicate about energy provision and consumption. The communication may be accomplished by installing or retrofitting an electricity meter device at the location of an energy consumer, and utilizing a communications link (for example the internet, telephone, radio frequency, satellite, television, email, text message, etc.) between the consumer and the utility company.

One type of device consumers may use to facilitate such communications is a smart meter. In contrast to traditional energy meters, smart meters may have the ability to receive signals from an energy provider concerning the price of energy, current demand levels, requests to adjust energy consumption, etc. Such signals received by a consumer's smart meter or other device may be called demand response ("DR") signals. Smart meters may also have the ability to send signals back to an energy provider (often called "DR response" signals) regarding the consumer's energy usage.

Utility companies or third parties may take advantage of smart meters in order to influence demand and maintain grid stability. Approaches to influencing demand or otherwise maintaining grid stability may be termed "demand response" programs.

Demand response programs may take several forms, such as communicating with energy consumers about the price of energy, the supply of energy, upcoming events relating to energy pricing or supply, energy demand, upcoming vacations by an energy consumer, etc. For example, a pricing-based demand response program may operate such that during periods of high demand, energy prices may be raised, and during periods of low demand, prices lowered. Such pricing adjustments can be beneficial, especially as there are limited means available to store energy once it has been generated for later use. Appropriate energy pricing adjustments, therefore, may help to avoid situations of energy glut and energy scarcity. The ability to appropriately adjust the price of energy, however, depends on the ability to accurately measure, predict, and plan for, rather than respond to, consumer demand.

Smart grids may be implemented to varying extents within a geographical area. For example, smart grids comprising smart meters in communication with energy providers (or third parties) may be deployed throughout a country, state, city, neighborhood, or even a single building. As discussed further below, individual energy consumers may be associated with one or more smart meters, and the smart meters may communicate directly with an energy provider, or with a third-party (e.g., a consulting company).

Energy providers struggle to accurately measure, predict, and plan for consumer demand. The task of effectively and efficiently conducting energy provision operations can be complex where there are high volumes and various types of energy consumption data to work with. Moreover, measurements and predictions of energy demand can be difficult to understand and integrate into the operations of an energy provider. Especially in view of the high fixed costs that energy providers face (e.g., costs of infrastructure and repair), and providers' corresponding aversion to risk and large-scale change, integrating demand measurements and predictions into the operations of energy providers can be important but challenging to do in a cost-effective manner.

Methods and systems described herein allow for energy consumption, energy demand, and potentials for energy reduction or energy shift to be measured, expressed, and forecasted in advantageous ways. The various methods and systems described herein allow energy providers to better understand the factors that drive energy consumption, and to make adjustments to their operations, if needed. Among other advantages, the methods and systems described herein may indicate to energy providers ways to attempt to influence the consumption of energy, or to plan for anticipated changes in energy consumption.

Referring to FIG. 1A, an exemplary arrangement 100A for communicating demand response ("DR") signals 102 and DR response signals 105, is depicted. In some embodiments, an energy provider 101 (e.g., a provider of electricity, natural gas, heating oil, propane, etc.) may send a DR signal 102 to some or all of its energy consumers 104. Energy consumers 104 may be residential consumers, commercial consumers, government consumers, or any other type or combination of energy consumers. DR signal 102 from energy provider 101 may include or otherwise indicate various types of information regarding energy consumption, such as the current or future price of energy, current or future demand levels, temperatures for heating or cooling systems, requests to adjust energy consumption, and/or requests that automatically adjust energy consumption.

Figure 1B:
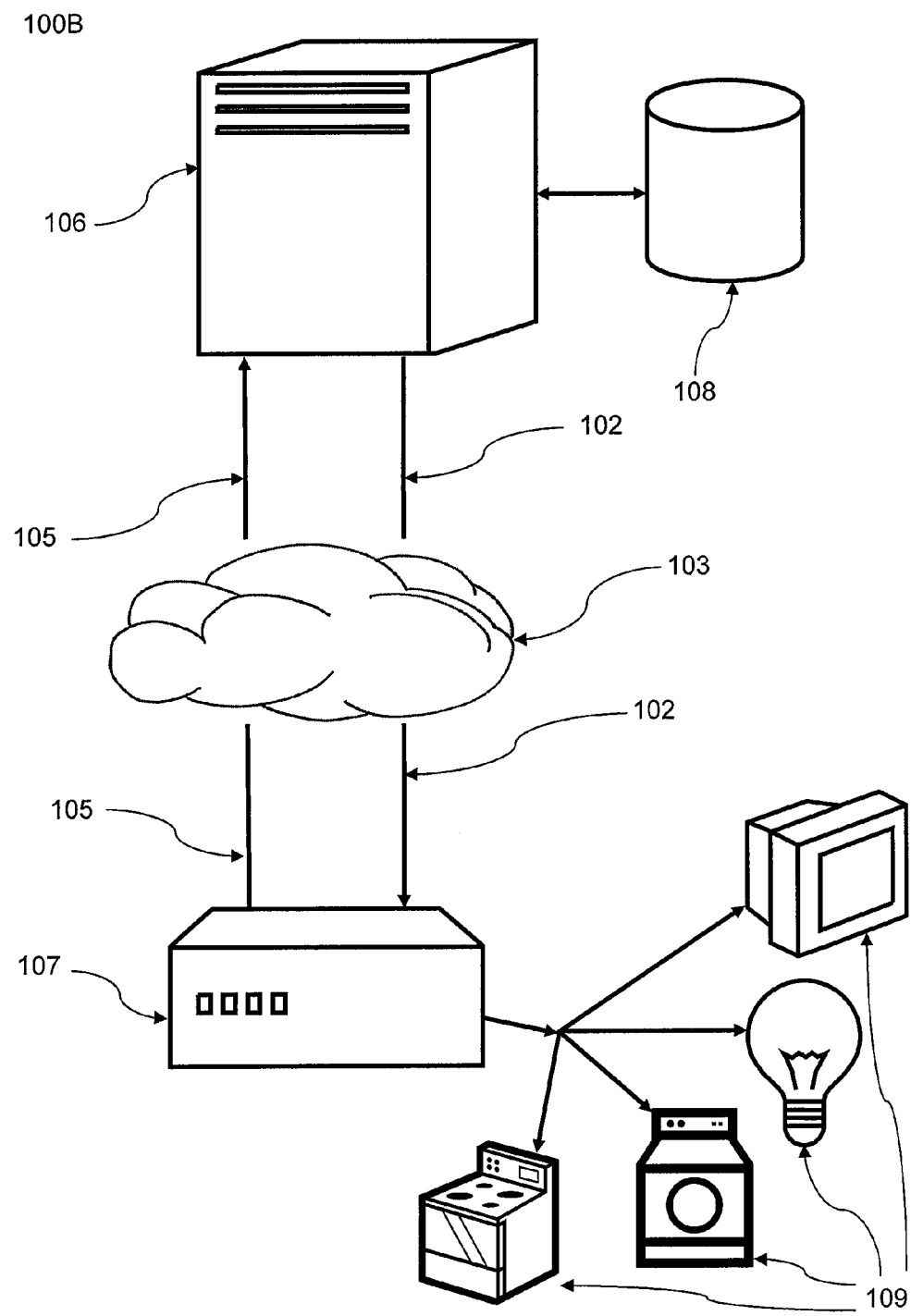
FIG. 1B depicts an exemplary system for communicating DR signals and DR response signals between a server and a device capable of receiving DR signals.

FIG. 1B depicts an exemplary system 100B for communicating DR signals 102 and DR response signals 105 between a server 106 and a device 107 capable of receiving DR signals. Device 107 that receives DR signals 102 may be placed at the location of energy consumer 104 (e.g., in a consumer's home or business, or affixed to an outer wall of such a building). In some embodiments, DR signal 102 may be received by energy consumer 104 remotely (e.g., via a cellular telephone, pager, or computer). Device 107 may be a smart meter or DR Gateway device, or other device capable of receiving DR signals 102. Device 107 may include a graphical display, light-emitting diode display, indicator lights, dials, etc., which indicate aspects of the device's operation. For example, device 107 may include a graphical display that indicates that device 107 is on, connected (e.g., to a wireless network, to a wired internet connection, etc.), and communicating successfully with energy provider 101. As another example, device 107 may include indicator lights corresponding to various appliances 109 in a consumer's home, where the indicator lights indicate whether device 107 is successfully communicating with appliances 109. As further examples, device 107 may include dials, which indicate energy consumption levels (e.g., in kilowatts (kW), kilowatt-hours (kWh)). In some embodiments, device 107 may be connected to a consumer's television, computer, or other video display, and information regarding DR signals 102 may be displayed on the television, computer, or video display.

In some embodiments, multiple devices 107 that receive DR signals 102 may be used in combination, for example, with devices 107 positioned at different levels of a consumer's home or business, or at the location of individual appliances 109 in a user's home or business. In embodiments comprising multiple devices 107 that receive DR signals 102, a network scheme may be employed, where a central device 107 receives DR signals 102 and distributes them as needed to satellite devices 107 located throughout a consumer's home or business. In some embodiments, device 107 may be integrated with a consumer's circuit breaker box, thermostat, or other energy switching apparatus, such that the device 107 may both receive DR signals 102 and also conveniently control power levels and states for different zones, rooms, or individual appliances 109 with a consumer's home or business.

DR signals 102 may be transmitted to energy consumers 104 via any one or multiple of various communications media 103. Communications media 103 may include, for example, the internet, telephone, radio frequency, satellite, television, text message, email, pager, etc. In some embodiments, energy provider 101 may include a computer server 106 that communicates with device 107, which may be positioned at the location of energy consumer 104. DR signal 102 may be sent, for example, through a "push" or "pull" operation, or at predetermined intervals to energy consumer 104. Server 106 may use a database 108 for storing and organizing information, such as DR response signals 105 and influencer data (as discussed further below). Server 106 may also use a computer processor (e.g., microprocessor, microcontroller, personal computer, etc.) for processing the data received by the server 106, and other processing operations.

Once device 107 related to an energy consumer 104 receives DR signal 102 from energy provider 101, consumer 104 may choose to respond by adjusting their energy consumption. In some embodiments, DR signal 102 may automatically adjust the consumer's energy consumption without any affirmative action by the consumer 104.

As an example of "manual" DR response behavior, if consumer 104 received a DR signal 102 at 3:00 pm indicating that energy prices will rise by a certain amount at 5:00 pm, or that local demand is likely to increase at 5:00 pm, consumer 104 may choose to reduce their energy consumption at or around 5:00 pm by, for example, turning off or attenuating appliances 109 such as lights, televisions, computers, heating systems, etc. In some embodiments, DR signal 102 may be received by device 107, and in some embodiments DR signal 102 may be received energy consumer 104 by a device other than device 107.

As an example of "automatic" DR response behavior, if consumer 104 received DR signal 102 at 3:00 pm, indicating that energy prices or demand levels were going to rise beyond a threshold level chosen by the consumer 104, at 5:00 pm, some or all of the consumer's energy consuming devices 109 may be automatically shut off or attenuated at or around 5:00 pm. This "automatic" type of energy adjustment may be accomplished, for example, using a wireless network or circuitry to control an energy consuming device 109 capable of receiving DR data 102. The controller may compare the information contained in DR data 102 with threshold data, and set the device to "on," "off," or "attenuate" based on whether the threshold is met. For example, consumer 104 may set a threshold price level for electricity, such that when electricity prices exceed the threshold level, some or all of the consumer's energy consuming devices 109 are shut off or attenuated. In embodiments where the energy adjustment occurs automatically upon receiving DR data 102, consumers 104 may have an override option, whereby they can prevent automatic adjustment of energy consumption from occurring. In addition, consumers 104 may employ a hybrid approach, where certain energy consuming devices 109 automatically respond to DR signals 102, and other devices 109 rely on manual DR response behavior.

In some embodiments, after consumer 104 receives DR data 102 from energy provider 101, a DR response signal 105 may be sent from consumer 104 to energy provider 101. In other embodiments, DR response signal 105 may be sent without consumer 104 first receiving DR signal 102 from energy provider 101.

DR response signal 105 may comprise information relating to the energy consumer's response to DR signals 102. For example, DR response signal 105 may indicate the extent to which consumer 104 reduced or increased energy consumption in response to DR signal 102 (e.g., in kW, kWh, or as a percentage of consumption change). In some embodiments, DR response signal 105 may be specific to individual appliances 109 in the consumer's home, and in some embodiments, DR response signal 105 may include various other data, such as time and date information, local weather information, indoor temperature information, identifying information about consumer 104, etc.

DR response signal 105 from energy consumer 104 may be sent, for example, on an automatic, semi-automatic, or manual basis. DR response signal 105 may be sent using the same communications media 103 as DR signal 102, or via other media. In some embodiments, DR response signal 105 may be sent on a continuous or near-continuous basis, and in other embodiments, DR response data 105 may be sent at fixed intervals. For example, the consumer's smart meter or DR Gateway 107 may be configured to send a DR response signal 105 every hour. In other embodiments, consumer 104 may manually decide when to send DR response data 105, or energy provider 101 may request DR response data 105 from consumer 104. In some embodiments, DR response signal 105 includes information pertaining to specific energy consuming devices 109 of consumer 104 (e.g., a particular washing machine, television, etc.).

DR response signal 105 may be received by energy provider 101 or by a third-party, such as a consulting or outsourcing company. In various embodiments, DR response data 105 may be received by an energy provider 101 and then may be sent to a third-party, or may be received by a third-party and then may be sent to energy provider 101, etc. As discussed in further detail below, energy provider 101 or a third-party may analyze and apply DR response data 105 to optimize various aspects of the provision of energy.

Server 106 may be a typical World Wide Web server capable of communicating with Web clients, may be designed specifically to communicate with particular devices 107 capable of receiving DR signals 102 and sending DR response signals 105, may be a server designed to receive signals from, e.g., cellular telephones or satellite devices, etc. Server 106 may run server software such as Apache®, Weblogic®, WebObjects®, Oracle®, Caudium, etc. The server software may enable server 106 to send and receive DR signals 102 and DR response signals 105, to communicate signals to database 108 or other data storage medium, etc. Database 108 may run database software, which may be written in SQL, .QL, CQL, COQL, XPath, MDX, QUEL, DMX, etc. Other data storage media that may be used to store DR signals 102 and DR response signals 105 include service area networks, network attached storage, more temporary forms of storage, etc. In some embodiments, multiple databases 108 may be used to store DR signals 102, DR response signals 105, influencer data, etc., and in other embodiments, DR signals 102, response signals 105, influencer data, etc. are stored in one database 108 (e.g., in the same database file or in separate database files within the same database hardware unit). Server 106 and database 108 may be operated by an energy provider, by a third-party (e.g., a consulting company), a combination thereof, etc. In some embodiments, server 106 comprises a server farm, whereby multiple server hardware units receive a high volume of DR signals 102 in a concerted fashion. Such a server farm may include a load balancing device, which acts as an initial point of contact for incoming DR signals 102, and distributes DR signals 102 as appropriate to server hardware units.

Figure 2:
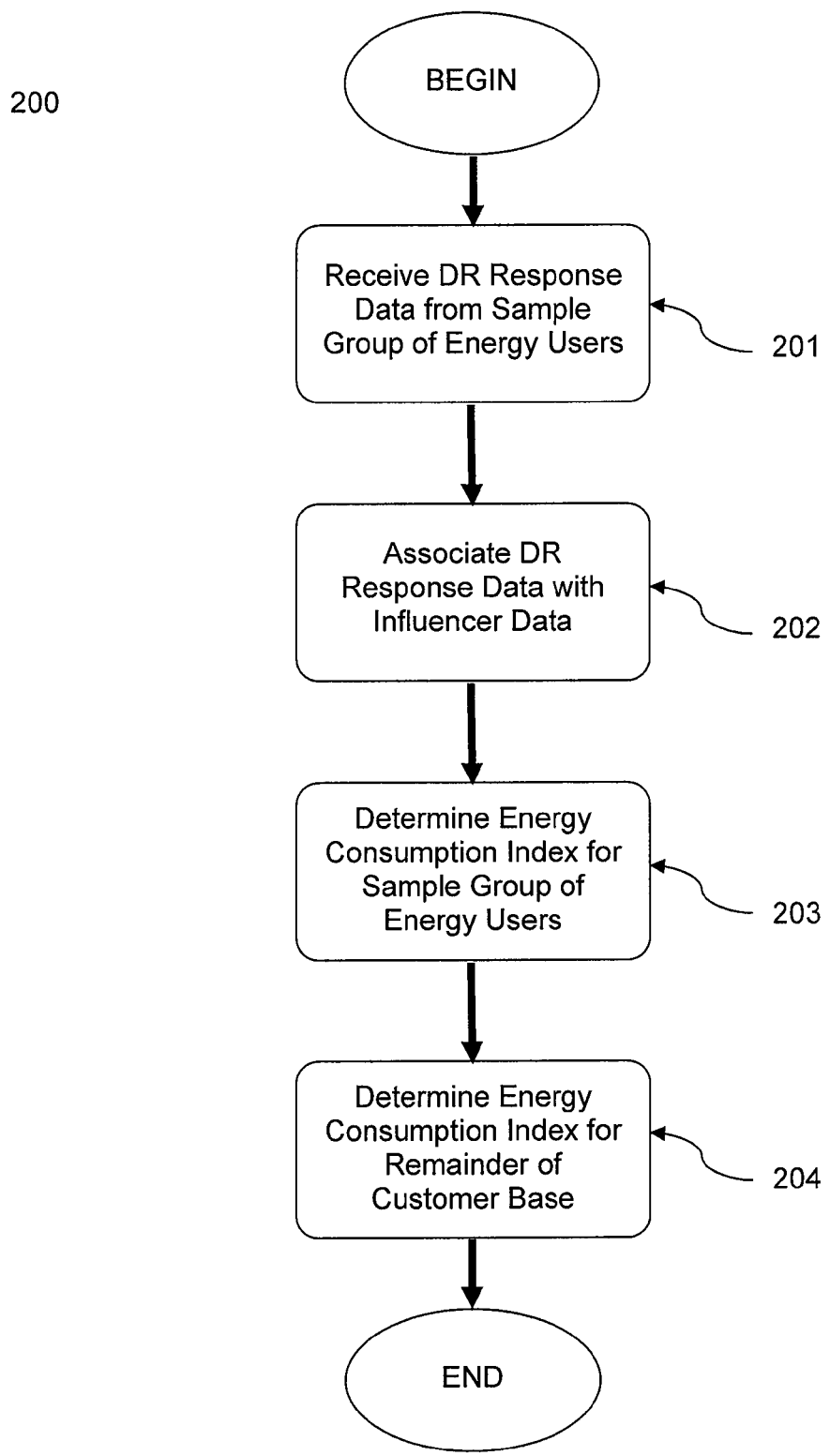
FIG. 2 depicts a flowchart showing, in general terms, one exemplary embodiment of a process of determining energy consumers' responsiveness to DR data.

FIG. 2 represents a flowchart depicting, in general terms, one exemplary embodiment of a process 200 of determining energy consumers' responsiveness to demand response data. Process 200 may include a step 201 of receiving DR response data from a sample group of energy consumers. In some embodiments, the sample group of consumers may represent a portion of a customer base or a customer base in its entirety. For example, the consumers in the sample group may be chosen in terms of their geographic location, housing/building type, number of occupants, annual income, number of vehicles, age, characteristics of DR response data, etc. The sample group of consumers may include only consumers with the capability to receive DR signals and to send DR response signals, a combination of such consumers and consumers without such capabilities, etc.

Figure 3:
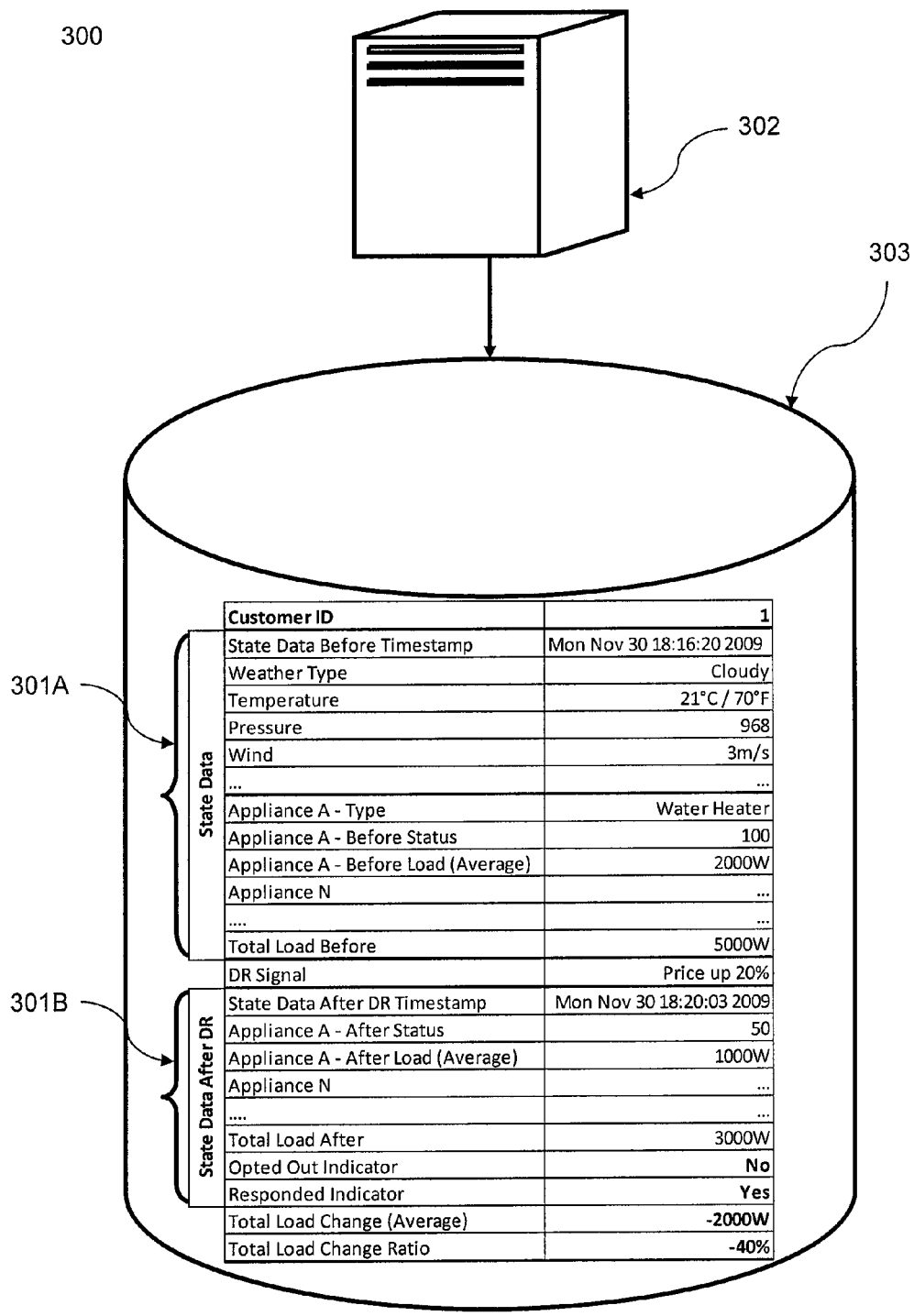
FIG. 3 depicts an exemplary system for storing DR response data in a database.

In some embodiments of process 200, step 201 may comprise storing the received DR response data from the sample group of consumers in a database or other similar data storage utility. For example, FIG. 3 depicts an exemplary system 300 for storing DR response data in a database 303. In some embodiments, data representing a consumer's energy consumption before receiving a DR signal 301A, as well as data representative of consumption after receiving a DR signal 301B, may be stored in database 303. Data 301A and 301B may include, among other things, a customer ID to identify the consumer, a timestamp, weather type, climatic information associated with the consumer's location, the consumer's energy consumption generally or on a per-appliance basis, the consumer's total or appliance-specific change in consumption after receiving a DR signal, whether the consumer responded to a DR signal or not, and what type of DR signal was sent or what it comprised, among other types of information.

In some embodiments, DR response signals may be sent from energy consumers to energy providers, or to third-parties (e.g., consulting companies), without the consumer first receiving a DR signal. Such signals may help the energy provider or third-party understand consumers' consumption behavior in the absence of DR signals, historical data, etc. In some embodiments, such signals may allow the energy provider or third-party to develop an energy consumption baseline for energy consumers. For example, if an energy provider ascertains a baseline of consumption in the absence of DR signals, the energy provider may be able to determine the effects on consumption that the introduction of a DR signal program may have. Such data may be captured, for example, at different times of the day, week, month, and year in order to obtain a broad perspective regarding the consumers' consumption behavior. In addition, these types of signals may comprise information similar to DR response signals. These signals may be received by a server 302 and stored in database 303 together with signals 301A, 301B, and may be associated with influencer data, as described below.

Figure 4:
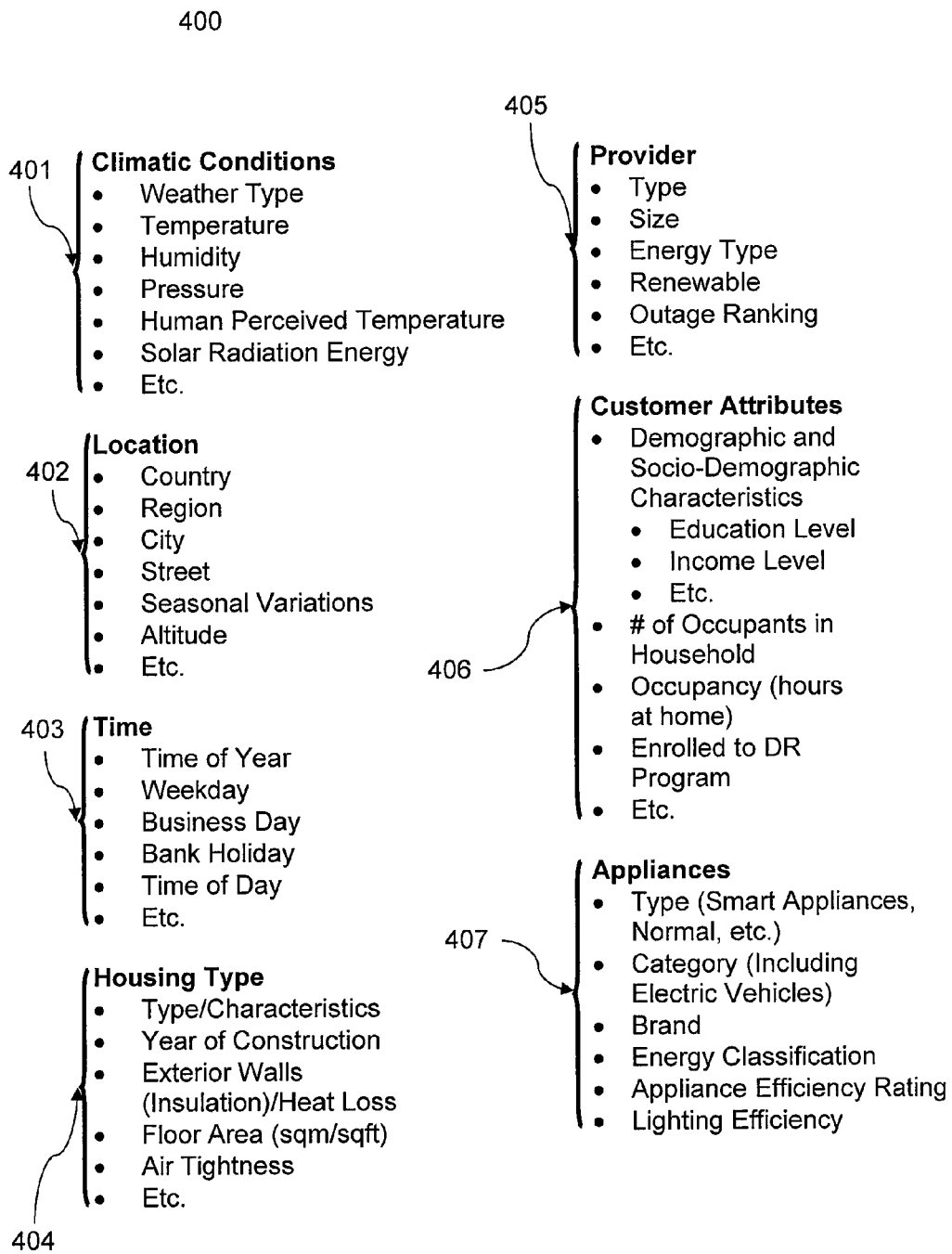
FIG. 4 presents several exemplary types of influencer data.

Referring again to FIG. 2, process 200 may also include a step 202 of associating DR response data with influencer data. The influencer data may represent conditions and factors relating to energy consumption. For example, FIG. 4 shows several exemplary types of influencer data 400, such as climatic conditions 401, location 402, time 403, housing type 404, energy provider characteristics 405, customer attributes 406, and appliance attributes 407. Influencer data 400 may be obtained from consumers' DR response signals, from consumer surveys, census data, third-party research data, observational data, etc.

Figure 5A:
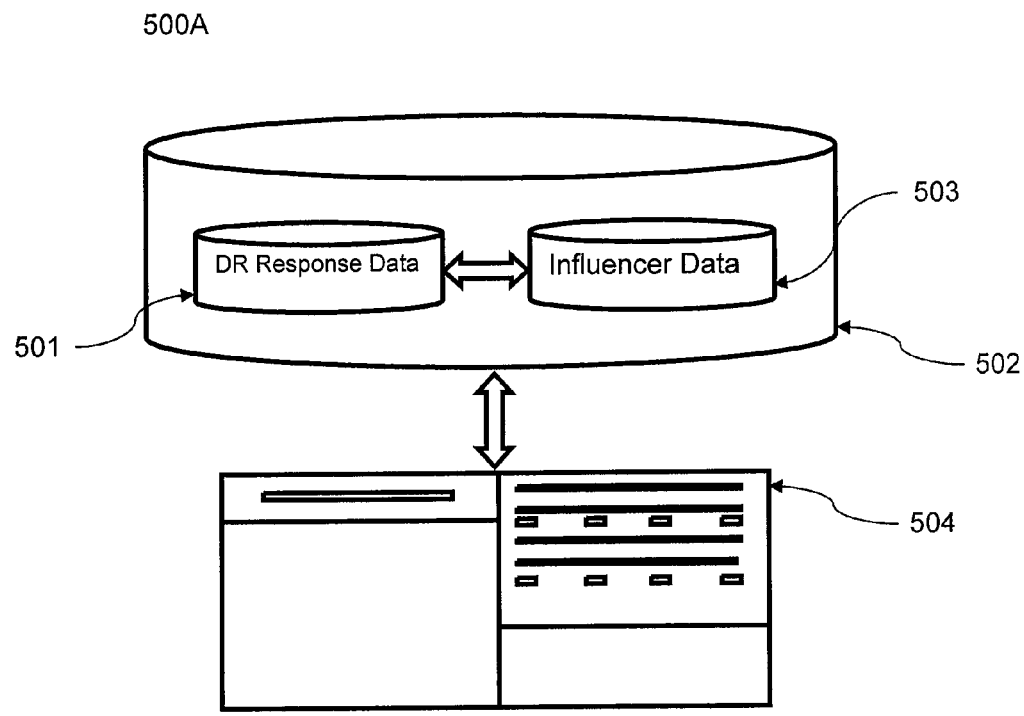
FIG. 5A depicts an exemplary system for associating DR response data with influencer data.

FIG. 5A depicts an exemplary system 500A for associating DR response data 501 with influencer data 503. In some embodiments, DR response data 501 and influencer data 503 may be stored in a relational database 502 or other structured data source. In other embodiments, DR response data 501 and influencer data 503 may be stored in separate databases, storage area networks, network attached storage, more temporary memory, etc. A computer processor 504, for example, a central processing unit, microprocessor, microcontroller, etc., may be used to process the DR response data 501 and/or influencer data 503.

Figure 5B:
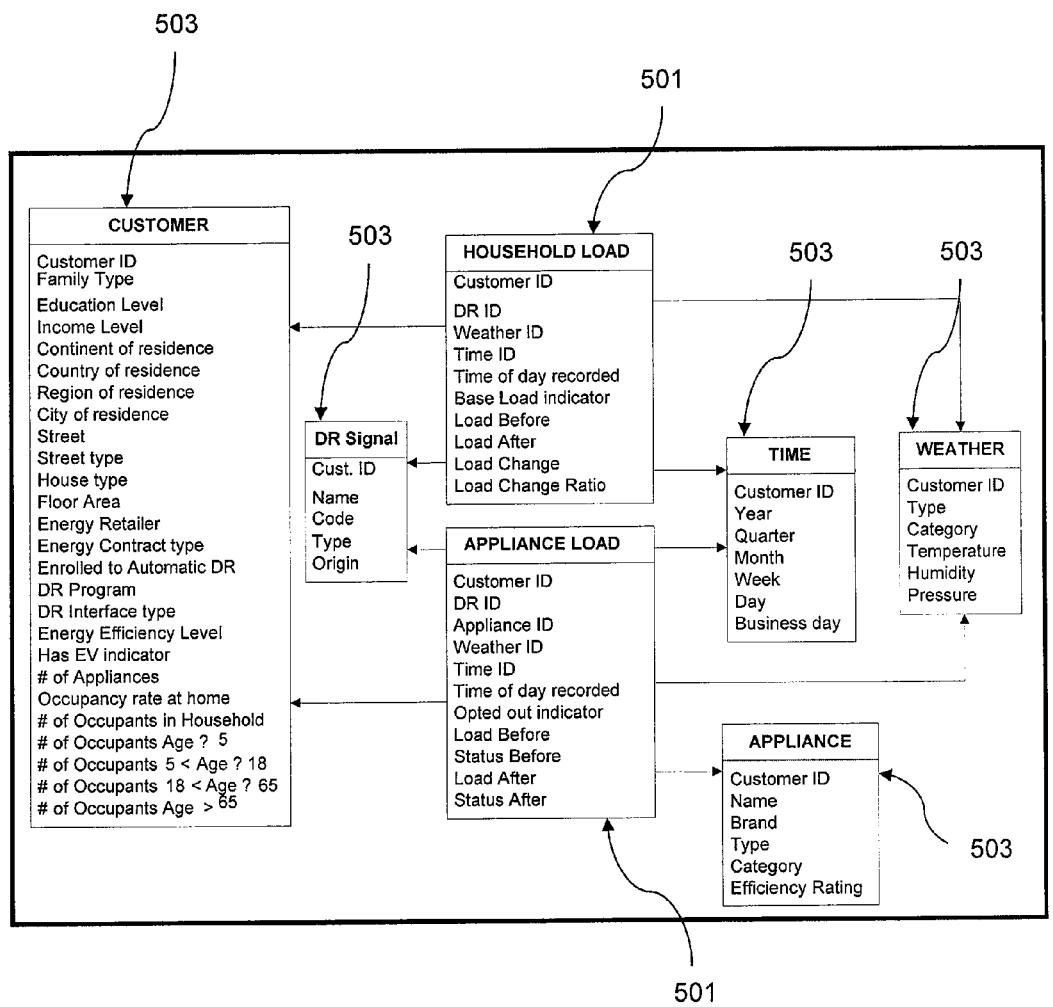
FIG. 5B illustrates an exemplary process of logically associating DR response data with influencer data.

In certain embodiments, a key or common element may be used to associate DR response data 501 with influencer data 503. For example, FIG. 5B illustrates an exemplary process of logically associating DR response data 501 with influencer data 503. As shown in FIG. 5B, the Customer ID may serve as a common element between the DR response data 501 and influencer data 503. The process of associating DR response data 501 with influencer data 503 may be termed "enriching" the DR response data. For instance, while DR response data 501 may include data such as a consumer's energy consumption before and after receiving a DR signal, by associating the DR response data 501 with influencer data 503, such as the customer's geographic location, housing/building type, climatic conditions, occupancy level, etc., the DR response data 503 is enriched to possess additional or different details relevant to energy consumption.

Referring to FIG. 2, process 200 may also include a step 203 of determining an energy consumption index for a sample group of energy consumers. In some embodiments, the energy consumption index may represent a consumer's energy consumption before receiving a DR signal, propensity to responding to a DR signal, change in consumption after receiving a DR signal, the time period over which the consumer's change in consumption persists, etc.

The energy consumption before receiving a DR signal may be expressed in various ways, including, for example, kilowatts (kW) or kilowatt-hours (kWh). The propensity of responding to a DR signal may also be expressed in several ways, such as a percentage of how often the consumer has responded to certain DR signals by either decreasing or increasing energy consumption, a measure of how often the consumer has done so with a sufficient magnitude of change, a likelihood that a particular consumer will respond to a particular DR signal by adjusting the consumer's level of energy consumption, etc. The average change in consumption may also be expressed in various ways, including, for example, kW, kWh, or a unitless ratio of consumption before receiving a DR signal compared to consumption after receiving a DR signal. Also, the time period over which the consumer's change in consumption persists may be expressed in several ways. For example, the persistence of change in consumption may be expressed in time (e.g., minutes, hours, days, etc.), or in both time and energy (e.g., a measure of energy reduction per hour, or per day, etc.).

Figure 6:
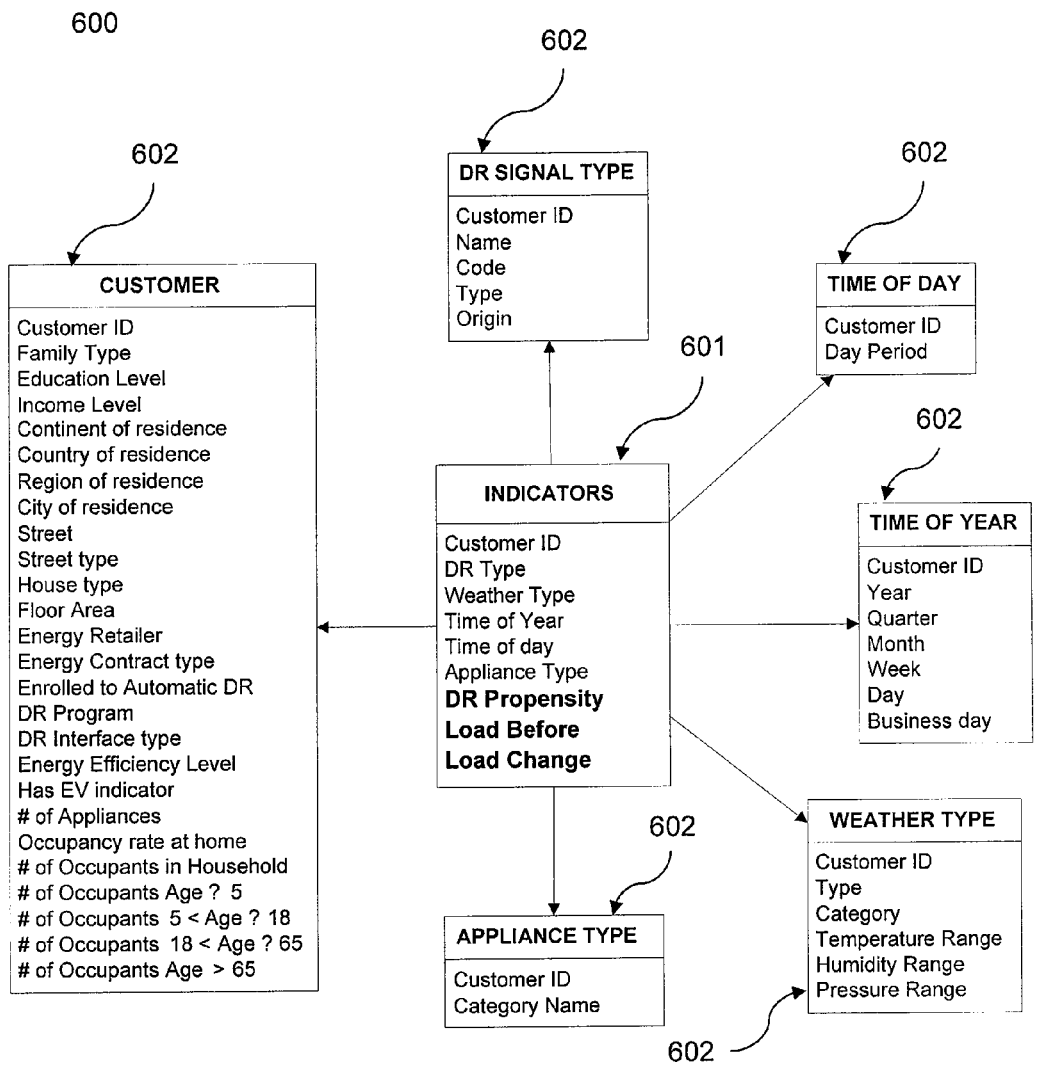
FIG. 6 depicts an exemplary data structure for an energy consumption index and various influencer data.

The energy consumption index may be represented in a three-dimensional space where the dimensions represent various forms of influencer data and other information. For example, FIG. 6 depicts an exemplary data structure for processing energy consumption index 600 and influencer data 602. Energy consumption index 600 may include indicators 601 related to DR propensity, load before receiving a DR signal, and load change after receiving a DR signal, for example. Indicators 601 may be associated with influencer data 602 using a common data attribute or "key," for example, Customer ID. In some embodiments, energy consumption index 600 may be expressed graphically, for example, in as a hypercube or online analytical processing ("OLAP") cube. Other multidimensional formats may be used as well. As an example, an OLAP cube may be constructed with indicator data 601 as a fact table, and influencer data 602 may serve as dimensions. FIG. 6 depicts a star schema type of data organization, however, other types may be used as well, such as a snowflake schema. Other possible ways to process multidimensional data, such as energy consumption index 600, are discussed further below.

Figure 7:
FIG. 7 depicts an exemplary data table comprising energy consumption index indicator data where several data fields are missing.

In some instances, data may be missing from an energy consumption index. Reasons for missing data could include, for example, a consumer turning off their DR Gateway, errors in data transmission between the consumer and the energy provider, or corruption of data received by the energy provider. FIG. 7 depicts a data table 700 comprising energy consumption index data 702, 703, 704, where data is missing from several data fields. In this example, the propensity data 702, load before receiving a DR signal 703, and load change after receiving a DR signal 704 are each missing an entry for Customer Type 1 for the DR signal type of "Price Up 15-19%. In such circumstances, it may be desirable to generate constructive values for the missing data fields. For example, multidimensional inter- and/or extrapolation methods may be used to derive constructive values for the missing fields. Upon doing so, the field indicating constructed data 701 may be marked "yes" to indicate that a constructive value was derived. In this manner, gaps in data table 700 may be reduced. In some embodiments, records of how constructive values are computed may be made, so that operators may later determine the viability of the energy consumption index and make changes to it, if needed. Such records could be stored in metadata associated with data table 700, or in a separate data file.

Figure 8:
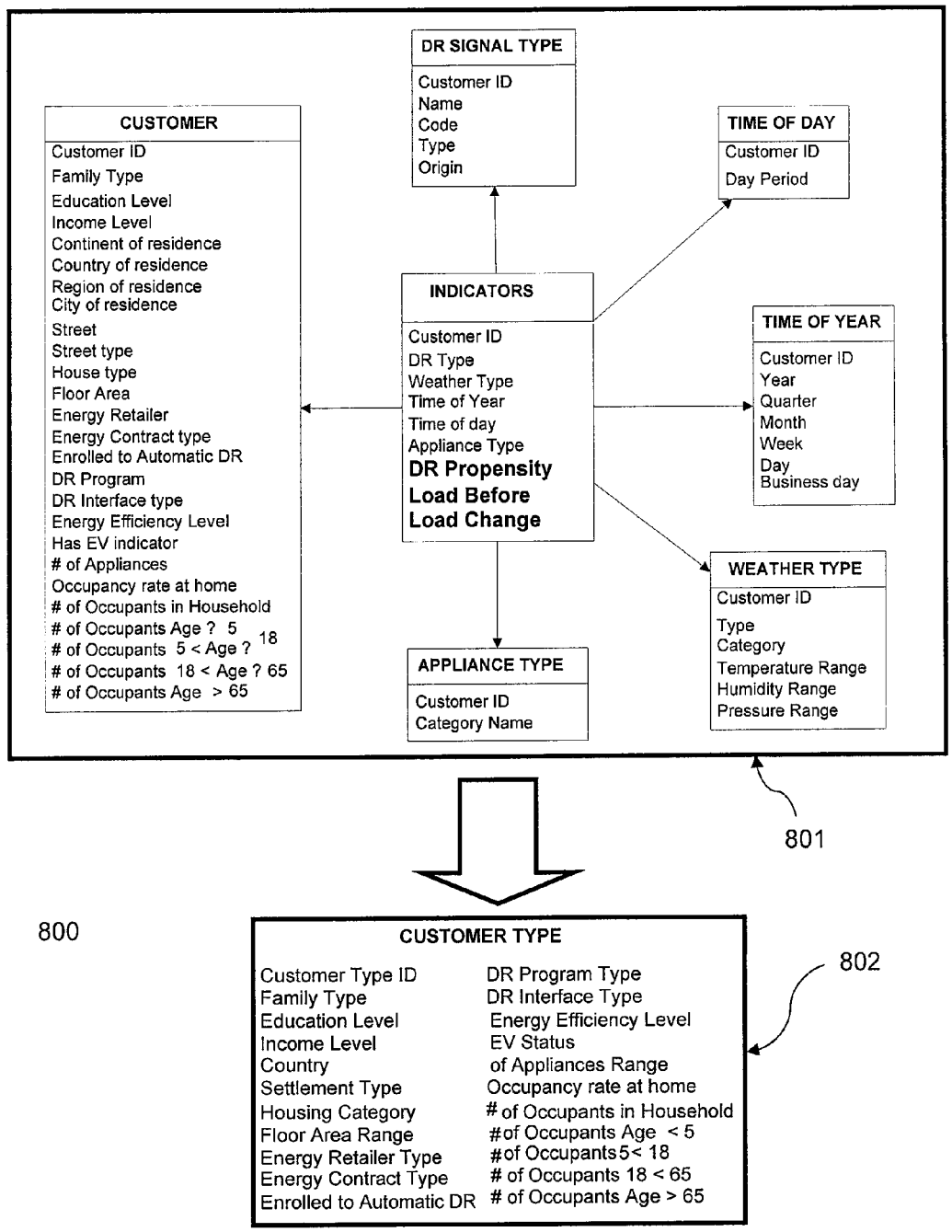
FIG. 8 depicts one exemplary process of segmenting consumers by customer type.

FIG. 8 depicts one exemplary process 800 of segmenting consumers by customer type 802. In connection with determining a consumer energy index for consumers, consumers within a sample group may be segmented. For example, consumers may be segmented in terms of factors relating to energy consumption such that consumers within a segment are likely to have similar energy consumption behavior. Another goal of segmentation may be to group consumers together for whom certain influencer data or enriched data 801 is found to accurately predict future energy consumption.

Each customer type 802 may be based on statistical correlations of enriched data 801 among consumers. For example, the "family type" customer type 802 may specify the familial or business relation between residents or occupants of a home or building. Other customer types 802 may include, for example, the volume of a home or building, number and type of automobiles, degree of natural shade provided by trees or other home or buildings, and various other factors.

Figure 9:
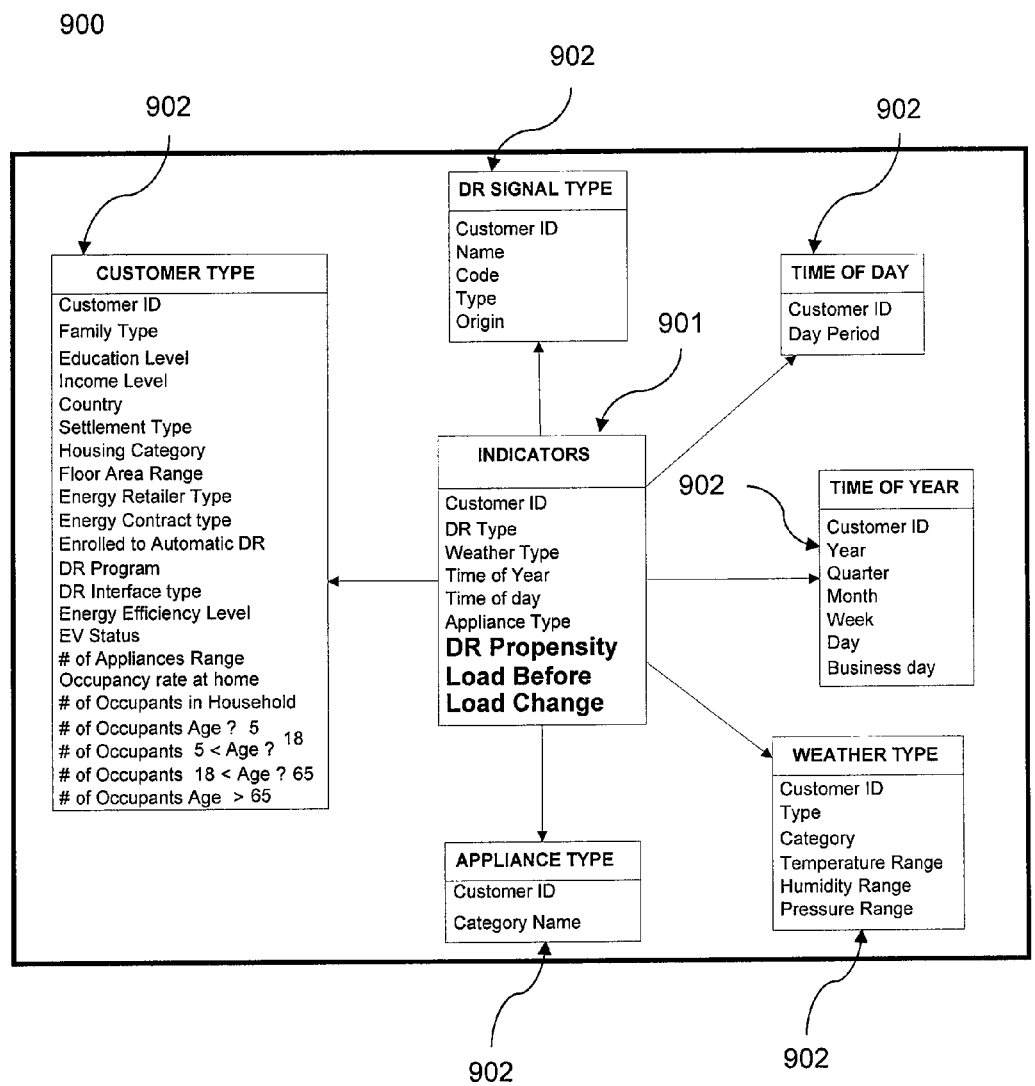
FIG. 9 depicts one exemplary data arrangement following a segmentation process, which shows energy consumption indicators and various enriched DR response data.

In some embodiments, as a result of the segmentation process, customer type 802 may replace the "customer" field from the enriched DR response data 801. For example, FIG. 9 depicts one exemplary data arrangement 900 following a segmentation process, which shows an energy consumption index 901 and various enriched DR response data 902, including Customer Type. Data arrangement 900 includes the index values 901 of DR propensity, load before receiving a DR signal, and load change after receiving a DR signal, for various Customer Types as function of influencer data 902. As discussed further below, segmentation of consumers within a sample group may facilitate the projection of energy consumption data for a broader customer base.

Referring again to FIG. 2, process 200 may also include a step 204 of determining an energy consumption index for a group of energy consumers other than those in the sample group. In some embodiments, this other group of energy consumers may include the remainder of an energy provider's customer base, or it may include only a portion of such a customer base. In other embodiments, this other group of energy consumers may include energy consumers other than those served by the energy provider. Further, in some embodiments, both groups of energy consumers may participate in a DR program (e.g., they may send and receive DR signals and DR response signals), and in other embodiments, some or all users in a group may not participate in a DR program. In additional embodiments, process 200 may include a further step of determining an energy consumption index for a group of energy consumers other than the groups of consumers described above. For example, process 200 may operate recursively, by using aspects of an energy consumption index to apply to a group of energy consumers, and using an energy consumption index from the group of energy consumers to apply to a further group of energy consumers, etc.

In some embodiments, referring again to FIG. 2, step 204 of determining an energy consumption index for a group of energy consumers other than those in the sample group, may involve comparing attributes of one group of consumers with attributes of another group of consumers. For example, when consumers are segmented as discussed above with reference to FIG. 8, consumers in one group may be compared with consumers in another group in terms of customer type 801. In some embodiments, a group of consumers for whom DR response data and influencer data is collected, energy consumption indexes are determined, and customer types 801 are determined, may comprise a sample group of consumers. In such embodiments, consumers outside of the sample group may comprise the remainder of an energy provider's customer base, a portion of such customer base, consumers not served by the energy provider, etc. In some embodiments, multiple customer types 801 may be used to represent a group of consumers.

For example, an exemplary sample group may comprise 10,000 consumers out of a customer base of 1,000,000 consumers served by an energy provider. From the 10,000 consumers within the sample group, 500 consumers may be determined to fall within the Customer Type 801 of Energy Efficiency Level based on their similar energy consumption behavior. For example, the 500 consumers may be found to fall between the 90$^{th}$ and 95$^{th}$ percentiles of energy efficiency, based on their use of energy saving or recycling devices. The 10,000 consumers from the sample group may be compared with the remaining 990,000 consumers within the energy provider's customer base, and correlations between the two groups may be determined. For example, a Customer Type 801 may be determined for the remaining 990,000 consumers in the customer base, and a correlation may be found between those consumers within the Customer Type 801 of Energy Efficiency Level and the 500 consumers within the same Customer Type 801 from the sample group.

Figure 10:
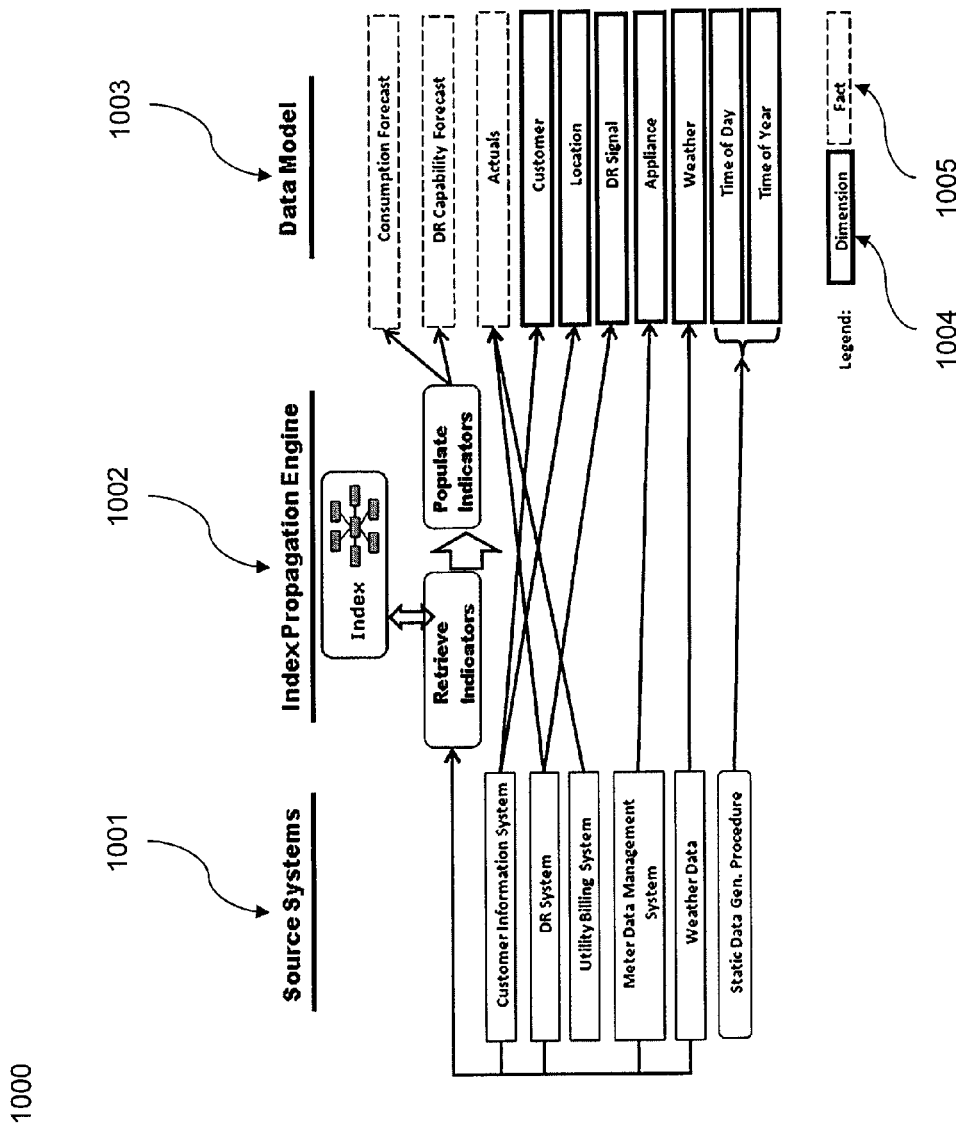
FIG. 10 represents one exemplary depiction of a process of determining an energy consumption index for a group of energy consumers other than those in the sample group.

FIG. 10 represents one exemplary depiction of a process 1000 of determining an energy consumption index for a group of energy consumers other than those in the sample group. Process 1000 may include source systems data 1001, an index propagation engine 1002, and a data model 1003. Source systems data 1001 may include various types of data, such as data identifying consumers, DR response data, utility meter data, weather data, etc.

Process 1000 may include a step of retrieving source systems data 1001 for a consumer outside of a sample group, for whom neither enriched DR response data nor an energy consumption index have been determined. In some embodiments, influencer data may be available for consumers outside of a sample group. Some or all of source systems data 1001 may be used by index propagation engine 1002. For example, index propagation engine 1002 may compare source systems data 1001 with data for consumers within a sample group. In some embodiments, the index propagation engine may use database software, which may be written in SQL, .QL, CQL, COQL, XPath, MDX, QUEL, DMX, etc. Based on sources systems data 1001 and comparable data for consumers within a sample group, as discussed above, correlations may be determined between the consumer outside of the sample group and one or more consumers within the sample group.

The consumer outside of the sample group may be assigned indicators (e.g., propensity to respond to a DR signal, load change after receiving a DR signal, etc.) by propagation engine 1002 based on indicators of the consumers within the sample group. The resulting indicators for the consumer outside of the sample group may then be used in data model 1003 to express a consumption forecast, DR capability forecast, actual consumption data, etc., for the consumer.

In some embodiments, the data model may be presented as one or more fact tables with various dimensions. For example, in the embodiment shown in FIG. 10, the consumption forecast, DR capability forecast, and actual consumption data may represent fact data 1005, which can be used in a data schema as a fact table. The customer, location, DR signal, appliance, weather, time of day, and time of year data may represent dimension data 1004, and may be used in a data schema as dimension data surrounding the fact table. The structure of such data schema may take several forms, for example, the form of a star or snowflake schema. The structure of such schema and the ways in which the data they contain may be graphically represented (e.g., as an OLAP cube) is discussed further below.

Once energy consumption indexes for consumers within the group other than the sample group are determined, the indexes may be used to forecast energy consumption, the impact of DR signals on energy consumption, etc. For example, based on certain influencer data and energy consumption indexes, various scenarios of energy provision may be forecast. The various forms of influencer data and energy consumption indexes may enable energy providers to answer questions such as: For all locations and all consumers, what will be the average DR response to DR signal "X" in the month of November? What kind of consumer groups are the most price-sensitive during summer months, and what is their average price threshold? During the weekends in February, which consumers have the most negawatt (i.e., power saving) potential? If last week, DR program "Y" was the most efficient program, which program will be the most efficient during afternoons next week, and what are the similarities between the consumers that have signed up to this program? What kind of DR signal should be sent out to shed 1 GWh during the next 4 hours, and which consumers should it be sent to? What levels of energy efficiency or negawatt potential can be achieved among a group of non-DR users based on the changes in energy consumption associated with energy users who send and receive DR signals and DR response signals?

Figure 11:
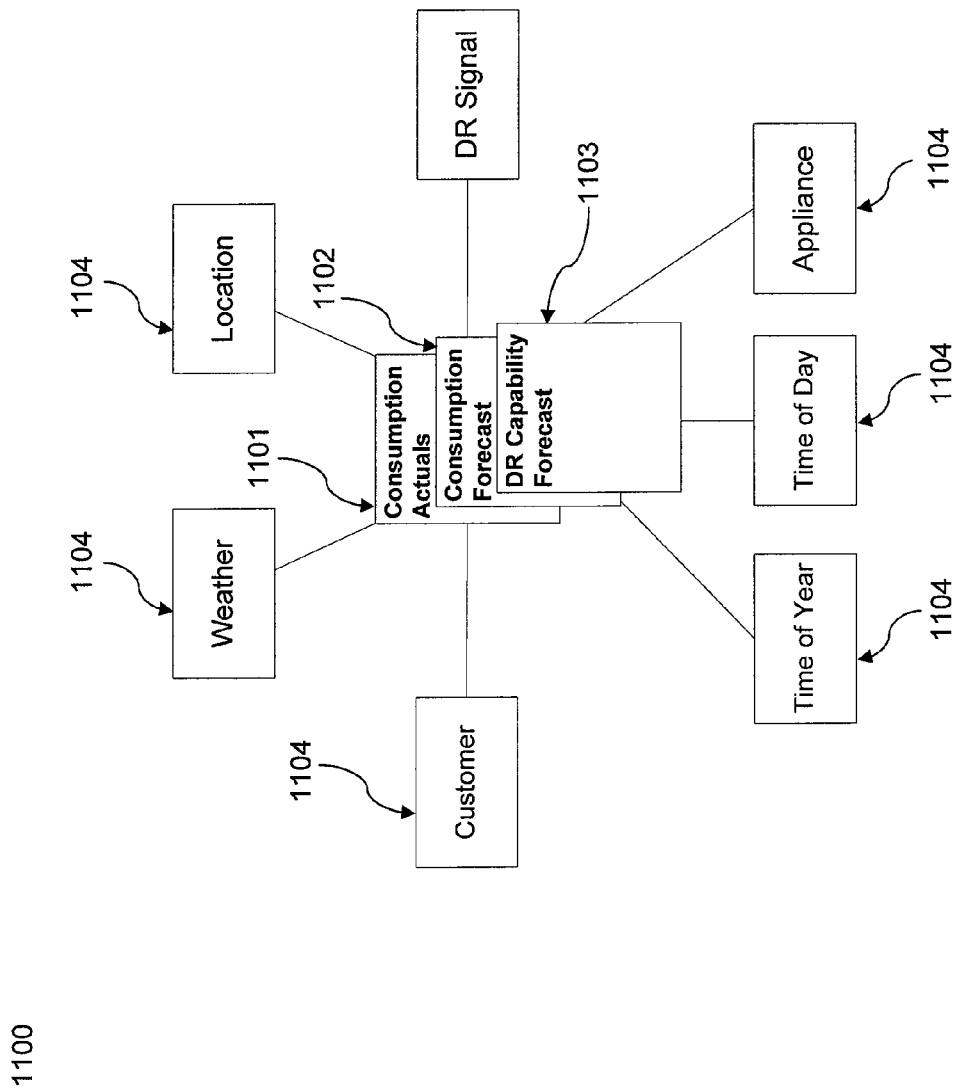
FIG. 11 depicts one exemplary data structure for use in utilizing consumption data, consumption forecast data, and DR capability forecast data, as well as various dimension data.

FIG. 11 depicts one exemplary data structure 1100 for utilizing consumption data 1101, consumption forecast data 1102, and DR capability forecast data 1103, as well as various dimensions 1104, such as weather, location, DR signal, appliance, time of day, time of year, and customer. Consumption data 1101, consumption forecast data 1102, and DR capability forecast data 1103 may represent the fact tables in structure 1100. In some embodiments, consumption forecast data 1102 and DR capability forecast data 1103 may be populated using the energy consumption indexes discussed above, and in some embodiments, consumption data 1101 may be obtained from consumers' DR Gateways from utility company records, etc.

DR capability forecast data 1103 may indicate a given consumer's propensity to respond to a certain DR signal. In some embodiments, the granularity of DR capability forecast data 1103 may be on a per-transaction basis, with one line for each logical intersection with various dimensions 1104. The range of values for DR capability forecast data 1103 may be from zero to one (e.g., 0.00-1.00), may be expressed as a percentage, or may be expressed in other ways.

Consumption forecast data 1102 may include information regarding the forecasted energy consumption of a consumer. Granularity for consumption forecast data 1102 may be on a per-transaction basis, with one line for each logical intersection with various dimensions 1104. Consumption forecast data 1102 may be expressed in energy (e.g., kWh), average load (e.g., kW), etc.

Consumption data 1101 may include information regarding the actual consumption at any given time for a consumer. Granularity may be on a per-transaction basis, with one line corresponding to every time the consumption changes. Consumption data 1101 may be expressed in energy (e.g., kWh), average load (e.g., kW), or in another manner.

Some or all of dimensions 1104 shown in FIG. 11 may be used in data structure 1100, or they may be used in combination with other dimension data. For example, a DR signal dimension may describe various DR signals and information for both automatic and manual DR signals, as well as the various types of possible DR signals (e.g. price, load shed, reliability, etc.). An appliance dimension may represent various appliances in a consumer's home or building (e.g., home appliances, HVAC systems, water heaters, etc.). A customer dimension may include information describing the consumers, e.g., supplied by a given energy provider. Attributes of the consumers may be extensive, such as age, gender, education level, employment status, income level, number of appliances, number of occupants in home, time and length of commute, number of vehicles, use of an electric vehicle ("EV"), average occupancy (e.g., hours at home, etc.), working hours, DR program status, house type (e.g., insulation type, exterior walls, etc.), home area or volume, residential location (e.g., country, region, city, street, etc.), and owner versus renter status. A time of year dimension may indicate a timeline extending into the past or future, and it may represent attributes such as year, month, week, day, date, business day indicator versus weekend, etc.). A time of day dimension may indicate information regarding the time of the day (e.g., in minutes or hours), with attributes like hour and day segment (morning, afternoon, evening, night, etc.). A weather indicator may describe the various weather types and temperatures (e.g., Celsius, Fahrenheit), including pressure and wind levels, as well as various types and magnitudes of precipitation. A location dimension may indicate the continent, country, region, city, or street of a consumer.

Figure 12:
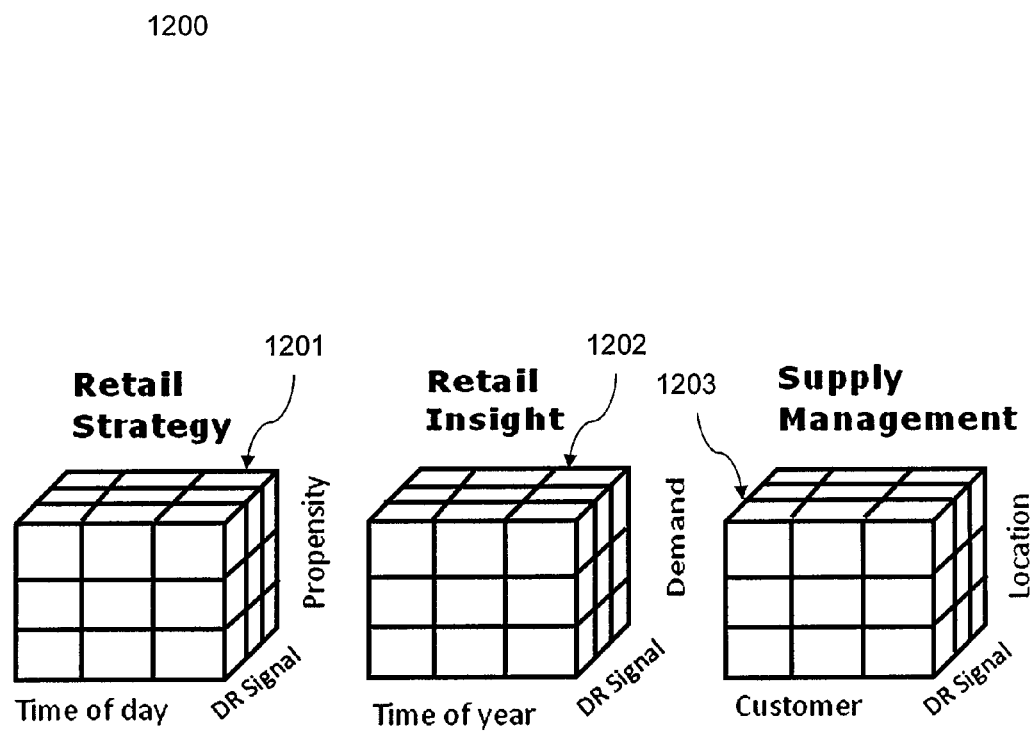
FIG. 12 depicts one exemplary embodiment of graphically representing data.

Data from structure 1100 may be analyzed and graphically represented in various ways. One such way, that of an OLAP cube, was discussed above with respect to the energy consumption index. As shown in FIG. 12, a graphical representation 1200 may be created with OLAP cubes 1201, 1202, and 1203. Using OLAP cubes, users may query data sources (e.g., data structure 1100 from FIG. 11) quickly and in a multidimensional manner. Various hierarchies may be developed for a data source (e.g., hierarchies of month, week, day, hour, etc.), thus allowing each of the elements or attributes of a dimension (e.g., "weather") to be analyzed.

In some embodiments, dimension data may be structured in order to facilitate managing the data. For example, FIG. 13 depicts one exemplary hierarchical structure 1300 of dimension data 1301. A dimension 1301 may have one or more associated levels 1302, which specify the hierarchical relationship among dimension data 1301. Other hierarchies may also be used to manage dimension data selected by the user and the user's goals in analyzing the data.

In some embodiments, OLAP cubes may be incorporated into business software. For example, a dashboard may be created for areas of interest to a user. A dashboard may contain charts or dials associated with energy consumption data, and may include hyperlinks that users may follow in order to analyze data in a more in-depth manner. In other embodiments, OLAP cubes may be integrated into users interfaces (e.g., graphical user interfaces accessible via an Internet or intranet connection), such that users can interact with the cubes. For example, users may select dimension(s) they are interested in analyzing, and filter the data as desired. Users may store preferred settings for the interface, in order for preconfigured access to the interface the next time they use the interface. In some embodiments, custom reports may be generated based on the data accessible in the interface. In other embodiments, scheduled reports may be run based on the data available in the interface, thus allowing an energy provider or third-party the create and archive snapshots of the data.

Various tools may be developed to assist energy providers based on the types of data described above. The tools may be software-based, and may be implemented in one or more of numerous programming languages, such as C, C++, C#, Java, Lisp, Visual Basic, Python, Perl, F#, etc., or implemented in a program such as Microsoft Excel®. The tools may be based on the types of data described above, such as DR response data, indicator data, enriched DR response data, energy consumption indexes, DR capacity, and consumption forecasts.

One such tool is a demand planning tool, which may provide a highly granular (e.g., per-transaction) view of energy consumption data. Such a tool may receive real-time or near real-time DR response data from consumers, as well as enriched DR response data. Based on energy consumption index factors, such as load before receiving a DR signal, load change after receiving a DR signal, and propensity to respond to a DR signal, consumer demand may be monitored and forecasted as discussed above.

Another planning tool is an intraday forecast tool. This tool may receive real-time or near real-time DR response data from consumers, as well as enriched DR response data. One function of this tool may be to provide energy consumption forecasts for a given day. Based on the energy consumption indexes for various consumers, this tool may predict energy consumption throughout a day in certain geographic locations, thus enabling an energy provider to adjust the price or supply of energy to meet target consumption levels. Forecasts may be created on a per-customer, per-segment, or entire consumer base level in terms of customer type, location, time, DR signal, weather conditions, etc.

Figure 14A:
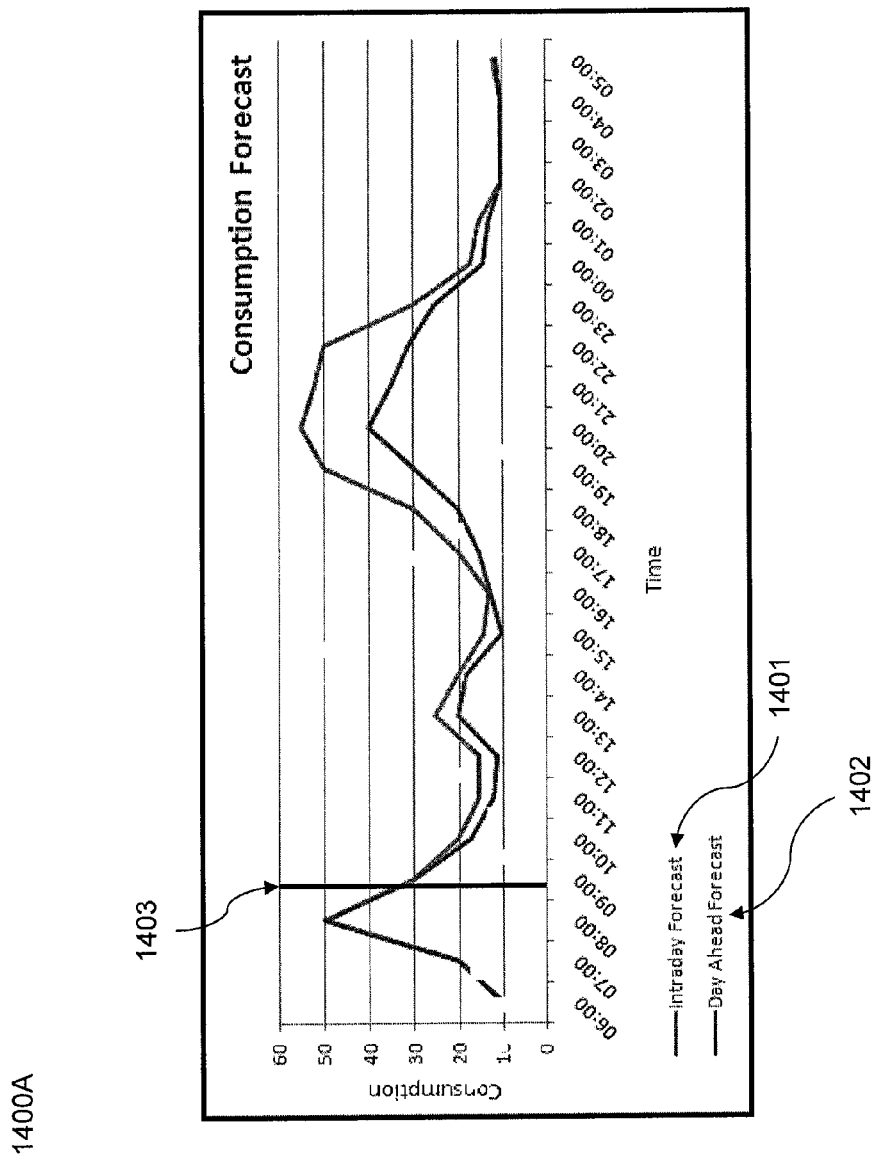
FIG. 14A depicts one exemplary embodiment of a graphical representation of energy consumption data in an intraday forecast tool.

FIG. 14A depicts one exemplary embodiment of a graphical representation 1400A of energy consumption data in an intraday forecast tool. Graphical representation 1400A may include both intraday forecast data 1401 and day ahead forecast data 1402. Intraday forecast data 1401 may represent a consumption forecast for a given day, and day ahead forecast data 1402 may represent the following day's consumption forecast. A vertical line 1403 may represent the current time, and may move rightward in real-time. The x or "time" axis may be represented in hours, or in another time interval, and the y or "consumption" axis may be represented as a percentage of output capacity, or as an actual load level (e.g., kW). Graphical representation 1400A depicted in FIG. 14 indicates that, from approximately 9:30 am to 2:30 am the following day, intraday consumption will be higher than for the day ahead. Among other things, graphical representation 1400A may assist a user to plan for actual energy provision to align with forecasted energy consumption.

Figure 14B:
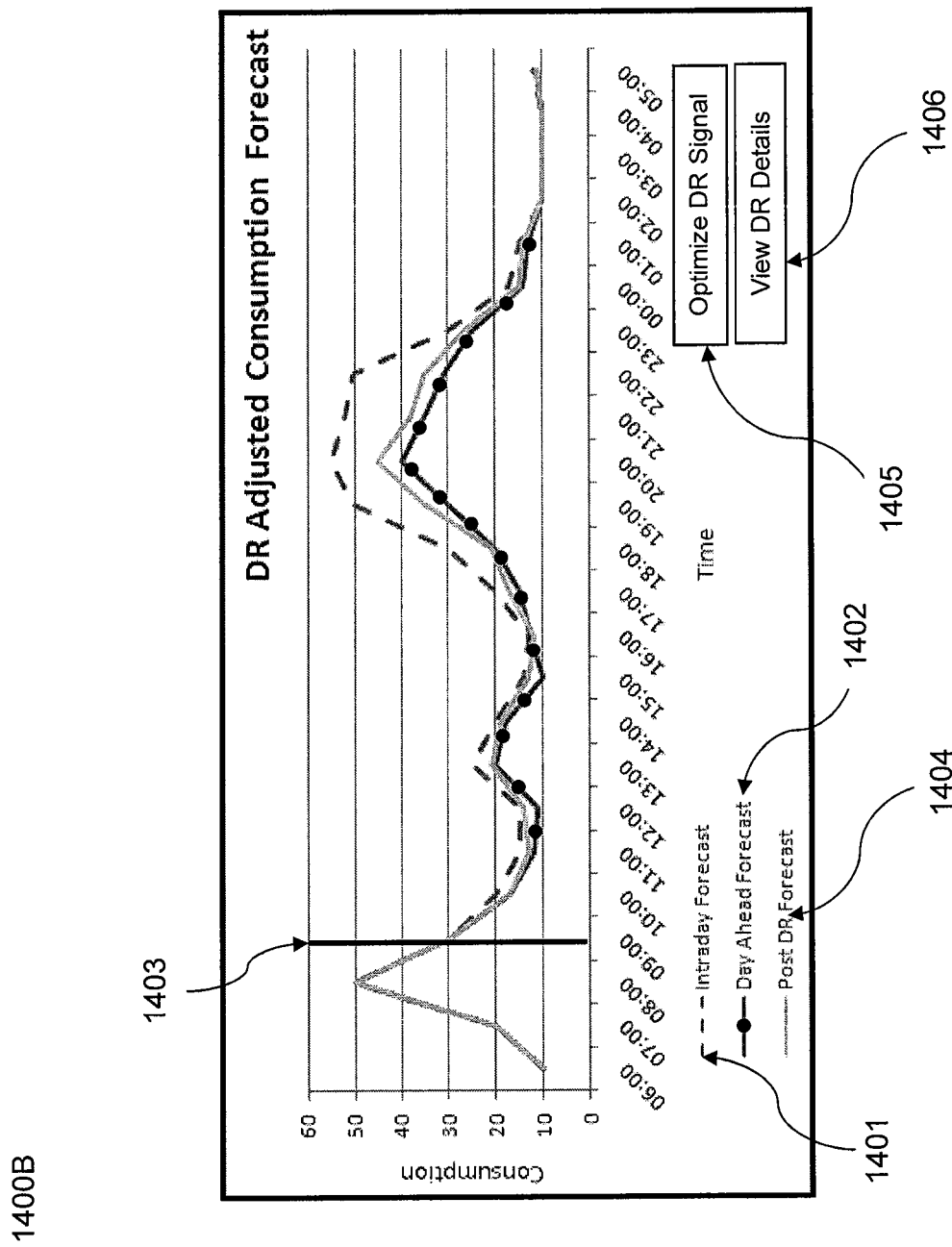
FIG. 14B depicts one exemplary embodiment of a graphical representation of energy consumption data in an intraday forecast tool.

FIG. 14B depicts one exemplary embodiment of a graphical representation 1400B of energy consumption data in an intraday forecast tool. In addition to intraday forecast data 1401 and day ahead forecast data 1402, graphical representation 1400B may include post DR forecast data 1404. The post DR forecast data 1404 may be the result of a simulation of energy consumption conditions, which may be run pressing the Optimize DR Signal button 1405. For example, Optimize DR signal button 1405 may trigger a simulation software routine, where optimal DR signals to send to consumers are determined by projecting the impact various types of DR signals would be expected to have on energy consumption. In some embodiments, the DR signal resulting in post DR forecast data 1404 that best approximates intraday forecast data 1401 or day ahead forecast data 1402 may be chosen as the optimal DR signal to send. Further, a View DR Details button 1406 may present the user with specific actions corresponding to a given optimal DR signal, such as the type of DR signal, the recipients of the DR signal, the time(s) the DR signal should be sent, the magnitude (e.g., in price or request to reduce consumption) of the DR signal, etc. The optimization of DR signals may be based various types of data, such as the weather conditions, a cost curve associated with energy provision, the revenue of the energy provider, etc.

A further planning tool is a strategic energy pricing tool. This tool may facilitate an energy provider's optimization of pricing, whether for an entire customer base or for segments thereof. One function of the strategic energy pricing tool may be to analyze price elasticity or demand elasticity for consumers and determine optimal pricing levels to maximize revenue at any given time. For example, the tool may estimate energy demand among various consumer segments using variables such as price or time, allowing energy providers to determine the price elasticity of consumers. By determining consumers' price elasticity and appropriate pricing levels, an energy provider may more effectively balance the incentives to adjust prices in view of factors such as customer loyalty or customer attrition. In addition, the tool may determine the effect DR signal programs may have on the relationship between consumption and cost, given a certain energy demand level. Energy providers may also project the effectiveness of both static and dynamic pricing schemes as part of various DR signal programs. In addition, by better measuring and planning for consumer price elasticity, energy providers may be able to enter into more competitive energy contracts that reflect strategic pricing schemes.

Figure 15:
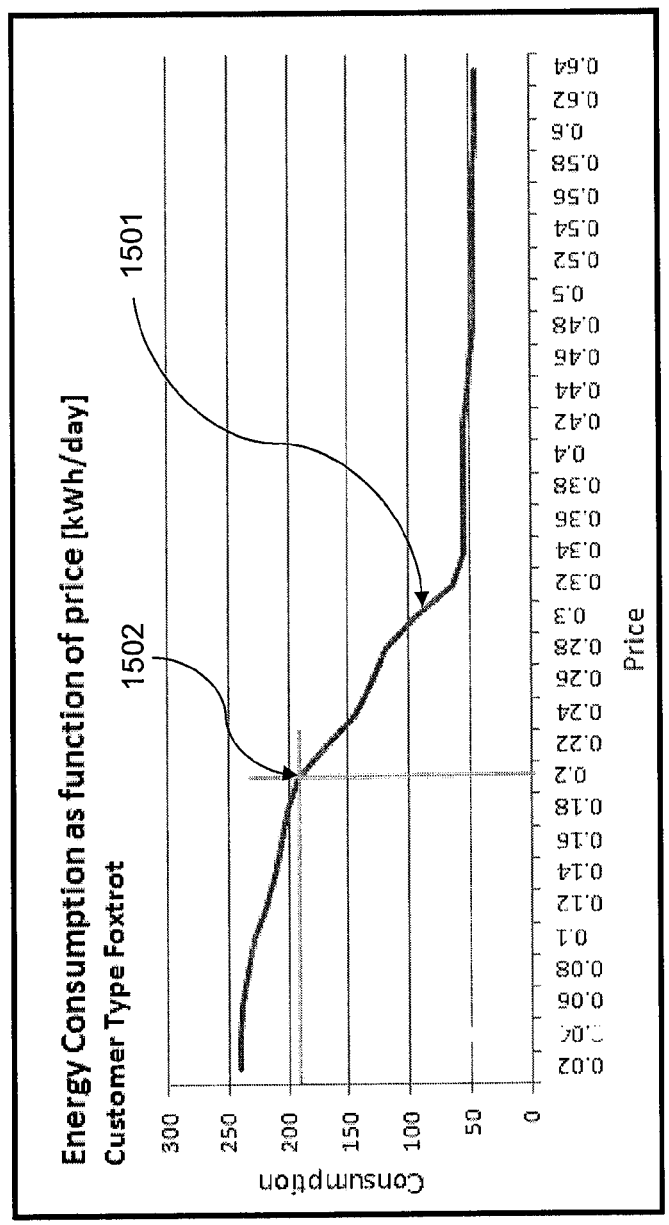
FIG. 15 depicts one exemplary embodiment of a strategic energy pricing tool.

FIG. 15 depicts one exemplary embodiment of a graphical representation 1500 of a price versus consumption chart in a strategic energy pricing tool. Graphical representation 1500 shows the daily energy consumption for a consumer segment with the Customer Type of "Foxtrot," as a function of price. The price elasticity curve 1501 may intersect with a certain consumption level and certain price level, such that revenue is maximized at the intersection point 1502. Using this tool, energy providers can analyze the sensitivity of various segments of consumers to the price of energy, and determine optimal pricing levels for each segment.

Another planning tool is a DR expansion tool. This tool may model the effect of potential expansions in DR programs, or the introduction of new DR programs in new geographic locations. Among other things, this tool may help energy providers determine the degree to which DR expansion will result in consumers altering their energy consumption in response to DR signals. For example, in certain embodiments, consumers currently participating in a DR program may be segmented, as discussed above, and energy consumption indexes may be determined for the consumers. Consumers in a potential new service area, in which a DR program has not yet been implemented, may be profiled based on various influencer data, and segmented as also discussed above. Based on the segmentation of both sets of consumers, and the correlations in consumption behavior found between them, energy providers may be able to project the energy consumption behavior of consumers in the potential new service area. For example, based on correlations in influencer data between existing consumers and potential new consumers, an energy provider may determine that the potential new consumers would be very receptive to DR signals, and would exhibit significant variability in energy consumption as a function of DR signals.

A further planning tool is an emergency management tool. One function of the emergency management tool may be to determine optimal DR-related activities to perform in order to prevent or mitigate emergencies in energy provision (e.g., power outage, equipment failure, excess production, etc.). The tool may also include features that involve DR signals, which can help an energy provider bring an energy grid back online after a failure.

Figure 16:
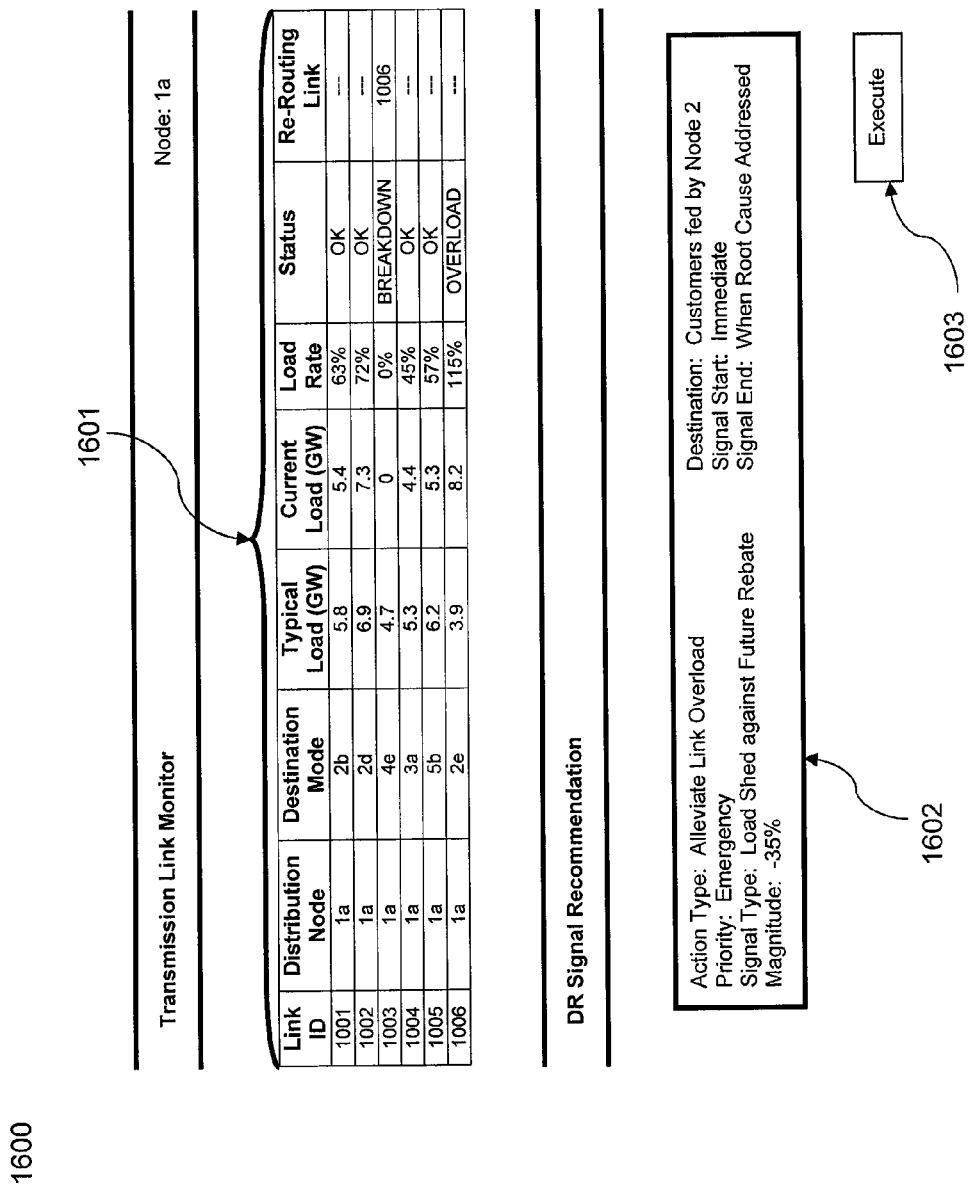
FIG. 16 depicts one exemplary embodiment of an emergency management tool.

FIG. 16 depicts one exemplary embodiment of an emergency management tool 1600, which includes transmission link monitoring data 1601 as well as a DR signal recommendation function 1602. Based on the transmission link monitoring data 1601, emergency management tool 1600 indicates that, for Distribute Node 1a, Link IDs 1001, 1002, 1004, and 1005 are operating under normal conditions, however, Link ID 1003 is experiencing a breakdown (e.g., loss of power) and Link ID 1006 is experiencing a power overload. According to tool 1600, and the Re-routing Link data, energy from Link ID 1006 may be diverted to Link 1003 in order to resolve the problems both Link IDs are experiencing, at least in part. In addition, DR signal recommendation 1602 indicates that a DR signal of "Load Shed against Future Rebate" may be sent to consumers in order to alleviate the overload in Link ID 1006. The magnitude of the planned load shedding is 35%, and the signal may be sent immediately until the root cause of the overload issue has been resolved. In some embodiments, the destination of the DR signal is also indicated by the DR signal recommendation function 1602, which, in FIG. 16, is the customers served by Node 2e. In some embodiments, an Execute button 1603 is provided, which, when pressed, may cause one or more DR signals to be sent in accordance with DR signal recommendation function 1602.

Another planning tool is a planned event management tool. This tool may function to assist energy providers in planning network maintenance or equipment replacements. In some embodiments, this tool indicates when consumer demand is expected to be at its lowest (e.g., during weekday nighttime hours in May). Based on such indications, energy providers may plan to perform network maintenance or equipment replacements that impact energy availability at such times, in order to minimize disruption of energy provision and minimize the lost revenue of network downtime. In some embodiments, energy providers may send consumers DR signals indicating that energy provision may be disrupted limited during such maintenance or replacement activity.

An additional planning tool is a negawatt capacity tool. Negawatt power is an expression of power saved or power not generated. This tool may provide highly granular negawatt capacity forecasts at a per-customer or aggregate level. Among other things, this tool may project the capacity of an energy provider to decrease energy consumption by sending out particular DR signals to certain consumers. For example, based on consumers' energy consumption indexes, or on consumption forecasts or DR capacity data, an energy provider may compute the projected change in energy consumption that sending specific DR signals to certain consumers will likely have. One benefit of the negawatt capacity tool is that it may help energy providers understand their current or future ability to decrease consumption of energy, and thus energy providers may address current or future imbalances in load in an energy network, may facilitate trading energy-based commodities or securities, and may help achieve higher levels of efficiency in energy provision. The tool may measure an energy provider's negawatt capacity in energy (e.g., kW), as a percentage (e.g., percentage of total output), or in a similar manner.

In some embodiments, the negawatt capacity tool may present a graphical display of negawatt capacity and an associated cost for a utility company. The cost may be the cost savings to the energy provider from reductions in energy consumption, the cost of providing energy (e.g., the cost of production and delivery), the cost of supplying energy in another energy market (e.g., a neighboring or more distant geographic area), etc. In such embodiments, a user may determine what impact a change in negawatt realization may have on cost. By allowing users to chart negawatt capacity versus cost, energy providers may make cost-effective decisions about where to supply energy, what levels at which to supply it, when to change energy provision programs, etc. The tool may enable an energy provider to effectively engage in energy arbitrage operations or participate in energy spot markets.

Figure 17:
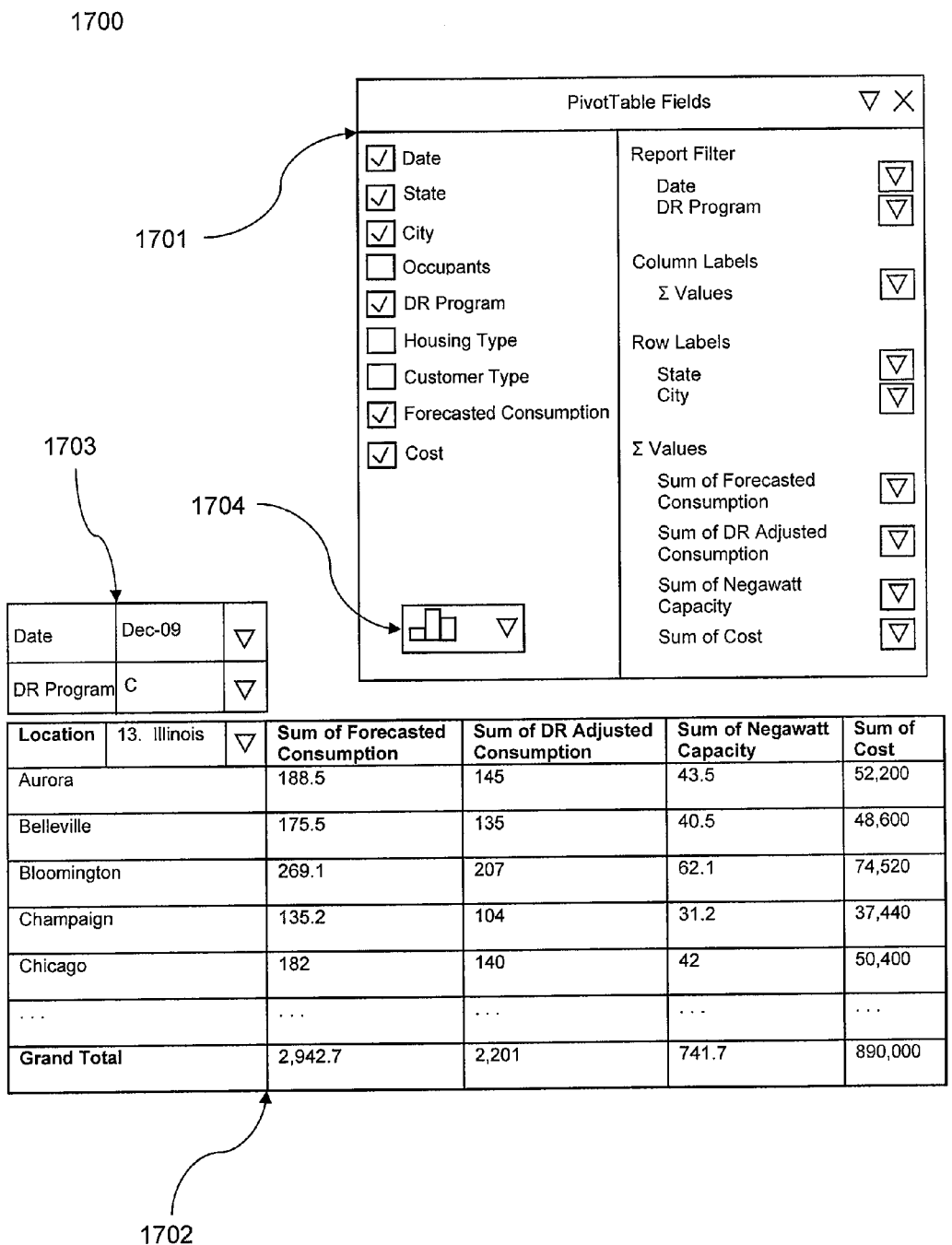
FIG. 17 is a depiction of an exemplary pivot table arrangement interface for viewing negawatt capacity data.

FIG. 17 is a depiction of an exemplary pivot table arrangement interface 1700 for viewing negawatt capacity data. Pivot table arrangement interface 1700 may be based in Microsoft Excel® or a similar data management program. Users may select various pivot table fields 1701, filter the data by certain fields 1703, and view the resulting pivot table 1702 of the data. In the embodiment shown in FIG. 17, users may view the negawatt capacity during December 2009 for Illinois, on a city-by-city basis. In some embodiments, as shown in FIG. 17, the cost associated with certain negawatt capacity (e.g., the loss in revenue from lost sales) may be indicated in pivot table 1702. Pivot table 1702 may be created based on specific DR programs (e.g., schemes for the type, content, and transmission of DR signals). For example, in FIG. 17, the DR program "C" is indicated as one of filtering elements 1703. In some embodiments, pivot table arrangement interface 1700 may include a button 1604 to graphically represent the data in pivot table 1702.

Another planning tool is a holistic DR explorer tool. Such a tool may enable energy providers to achieve a holistic and consolidated perspective regarding all of their DR initiatives. In some embodiments, this tool may comprise each of the tools described above, or may comprise links to such tools. The holistic DR explorer tool may be presented as one or more Internet or intranet pages, or may be presented as software run locally or on a network by a user.

Other embodiments will be apparent to those skilled in the art from consideration of the specification and practice of the invention disclosed herein. It is intended that the specification and examples be considered as exemplary only, with a true scope and spirit of the invention being indicated by the following claims. It is further intended that the embodiments described above may be combined as appropriate, such that features of one embodiment may be used in another embodiment.

What is claimed is:

1. A computer-implemented method of analyzing energy usage, comprising:
   receiving demand response ("DR") response data from a first group of energy users;
   associating the DR response data with influencer data, stored in a database, regarding the first group of energy users;
   determining, using a computer processor, an energy consumption index for the first group of energy users, wherein the energy consumption index comprises:
      a value of energy consumption before DR data is communicated to devices corresponding to the first group of energy users;
      a propensity of the first group of energy users to alter energy consumption in response to DR data; and
      a change in energy consumption, after DR data is communicated to devices corresponding to the first group of energy users; and
   establishing an energy consumption index for a second group of energy users based on the energy consumption index for the first group of energy users.

2. The method of claim 1, further comprising establishing an energy consumption index for a third group of energy users based on the energy consumption index for the second group of energy users.

3. The method of claim 1, wherein establishing the energy consumption index for the second group of energy users comprises correlating energy consumption behavior of the first group of energy users and energy consumption behavior of the second group of energy users.

4. The method of claim 1, wherein the energy consumption index for the first group of energy users further comprises a period over which energy change persisted.

5. The method of claim 1, wherein the second group of energy users is a subset of the first group of energy users.

6. The method of claim 1, wherein the DR response data comprise a value of energy consumption on a per-device basis.

7. The method of claim 1, wherein the influencer data consist of at least one of: climatic conditions, location, customer attributes, and housing type for an energy consumer in the first group of energy users.

8. The method of claim 1, wherein the energy consumption index for the first group of energy users is displayed in a star schema.

9. The method of claim 8, wherein the energy consumption index for the first group of energy users is displayed in a three-dimensional cube format.

10. The method of claim 1, wherein the DR response data is communicated between devices corresponding to the first group of energy users and a third-party.

11. The method of claim 1, wherein the first group of energy users comprises a sample group of consumers that are representative of an energy provider's customer base.

12. A system for managing energy usage by leveraging demand response ("DR") data, comprising:
   a first database storing DR response data received from usage devices corresponding a first group of energy users;
   a second database storing influencer data regarding the first group of energy users;
   a computer processor coupled to the first database and the second database, the computer processor associating the DR response data with the influencer data, the computer processor further determining an energy consumption index for the first group of energy users and establishing an energy consumption index for a second group of energy users based on the energy consumption index for the first group of energy users, wherein the energy consumption index for the first group of energy consumers comprises:
      a value of energy consumption before DR data is communicated to usage devices corresponding to the first group of energy users;
      a propensity of the first group of energy users to alter energy consumption in response to DR data; and
      a change in energy consumption, after DR data is communicated to usage devices corresponding to the first group of energy users.

13. The system of claim 12, further comprising a computer server coupled to the first database programmed to receive DR response data from the usage devices corresponding to the first group of energy users.

14. The system of claim 12, wherein the first database and the second database comprise the same database file and are housed in the same hardware unit.

15. The system of claim 12, wherein the first group of energy users comprises a sample group of consumers that are representative of an energy provider's customer base.

16. The system of claim 12, wherein the energy consumption index for the first group of energy users further comprises a period over which energy change persisted.

17. The system of claim 12, wherein the second group of energy users is a subset of the first group of energy users.

18. The system of claim 12, wherein establishing an energy consumption index for the second group of energy users comprises correlating energy consumption behavior of the first group of energy users and energy consumption behavior of the second group of energy users.

19. The system of claim 12, wherein the DR response data comprise a value of energy consumption on a per-device basis.

20. The system of claim 12, wherein the influencer data consists of at least one of: climatic conditions, location, customer attributes, and housing type for an energy consumer in the first group of energy users.

21. The system of claim 12, wherein the energy consumption index for the first group of energy users is displayed in a star schema.

22. The system of claim 21, wherein the energy consumption index for the first group of energy users is displayed in a three-dimensional cube format.

23. The system of claim 12, wherein the DR response data is communicated between usage devices corresponding to the first group of energy users and a third-party.

24. A computer-implemented method of managing energy provision, comprising:
    determining energy planning criteria for a group of energy users, wherein the energy planning criteria comprise:
        a forecast, created using a computer, of a propensity of the group of energy users to alter energy consumption;
        a forecast, created using a computer, of an energy consumption of the group of energy users; and
        a determination of an actual energy consumption of the group of energy users;
    determining an optimal level of a factor regarding energy provision based on the energy planning criteria;
    determining a signal to send to receiving devices of a target group of energy users to achieve the optimal level of the factor regarding energy provision, wherein determining the signal to send comprises:
        determining a type of demand response ("DR") signal to send to the receiving devices of the target group of energy users;
        determining the target group of energy users to whose receiving devices to send the DR signal; and
        determining a timing scheme for sending the DR signal to the receiving devices of the target group of energy users;
    sending the determined type of DR signal to the receiving devices of the determined target group of energy users in accordance with the determined timing scheme;
    receiving response data from the determined target group of energy users' receiving devices; and
    determining whether the energy consumption of the determined target group of energy users changed in response to the determined type of DR signal that was sent to the receiving devices of the determined target group of energy users.

25. The method of claim 24, further comprising simulating an effect of sending the determined type of DR signal to the receiving devices of the determined target group of energy users in accordance with the determined timing scheme.

26. The method of claim 24, wherein the factor regarding energy provision is the price of energy charged to the group of energy users.

27. The method of claim 24, wherein determining an optimal level of a factor regarding energy provision further comprises determining a price elasticity for the group of energy users.

28. The method of claim 24, wherein determining an optimal level of a factor regarding energy provision further comprises determining a demand elasticity for the group of energy users.

29. The method of claim 24, wherein determining an optimal level of a factor regarding energy provision further comprises simulating an effect of introducing a DR signal program into a new market.

30. The method of claim 24, wherein determining an optimal level of a factor regarding energy provision further comprises:
    determining the existence of a problem in an energy provision network;
    determining a type of DR signal to send to the receiving devices of the target group of energy users in order to alleviate the problem in the energy provision network.

31. The method of claim 30, wherein determining the type of DR signal to send further comprises determining a minimum level of energy load to be routed from a first area in the energy provision network to a second area in the energy provision network.

32. The method of claim 24, wherein determining an optimal level of a factor regarding energy provision further comprises determining a negawatt capacity of an energy provider.

33. The method of claim 32, wherein the negawatt capacity is graphically represented as a function of cost.

\* \* \* \* \*